US007295158B2

(12) United States Patent
Morris

(10) Patent No.: US 7,295,158 B2
(45) Date of Patent: Nov. 13, 2007

(54) SYSTEM AND METHOD FOR REAL TIME EFFECTS AUTOMATION

(75) Inventor: Andrew Michael Morris, Toronto (CA)

(73) Assignee: Morsonic Inc., Toronto (CA)

( * ) Notice: Subject to any disclaimer, the term of this patent is extended or adjusted under 35 U.S.C. 154(b) by 309 days.

(21) Appl. No.: 11/167,308

(22) Filed: Jun. 28, 2005

(65) Prior Publication Data

US 2005/0285791 A1 Dec. 29, 2005

Related U.S. Application Data

(60) Provisional application No. 60/582,974, filed on Jun. 28, 2004.

(51) Int. Cl.
*G01S 13/08* (2006.01)
*G01S 3/02* (2006.01)

(52) U.S. Cl. ....................... 342/463; 342/126; 342/139

(58) Field of Classification Search ................ 342/139, 342/133, 118, 126, 357.08
See application file for complete search history.

(56) References Cited

U.S. PATENT DOCUMENTS 6,882,315 B2 * 4/2005 Richley et al. ............. 342/465
6,975,229 B2 * 12/2005 Carrender ................ 340/572.4
7,043,316 B2 * 5/2006 Farchmin et al. ............. 700/99
2004/0008138 A1 * 1/2004 Hockley et al. ....... 342/357.09
2005/0085298 A1 4/2005 Woolston

OTHER PUBLICATIONS

Harvey, S., Sonic Spectacle—Celine Dion Dazzles Las Vegas With A State-Of-The-Art Surround Sound Theater To Hold Her New Act, United Entertainment Media, Inc., a CMP Information Company, Article A105045863, Morsonic Sound Direction, True Tracking Technology, Product Report, Section 5—References 050131, pp. 5-6 to 5-7, Jan. 31, 2005.

LCS Matrixing Vaulable Audio Tool In TRade Show Exhibits, ProSoundWeb.com, Morsonic Sound Direction, True Tracking Technology, Product Report, Section 5—References 050131, p. 5-8, Jan. 31, 2005.

(Continued)

*Primary Examiner*—Thomas Tarcza
*Assistant Examiner*—Harry Liu
(74) *Attorney, Agent, or Firm*—Bereskin & Parr; Isis E. Caulder

(57) ABSTRACT

An effects automation system for generating control data for the control of effects devices, based on the relative position of a mobile target. The system uses stationary receivers and stationary transmitter tags coupled to the stationary receivers and a mobile transmitter tag coupled to the mobile target. The stationary receivers receive signals received from the stationary and mobile transmitter tags and then send data based on these signals to a processing hub. The processing hub uses this data to determine the relative distance between the stationary receivers and the relative distance between the mobile target and the stationary receivers. Based on these relative distances, relative position values for the effect devices are calculated by calculating the proportion of the distance between the stationary receivers associated with the position of the mobile target. Finally, the relative position values are utilized to generate the control data for control of the effects devices.

38 Claims, 25 Drawing Sheets

OTHER PUBLICATIONS

McLane, D., Halloween In Hollywood Riverton Cemetery, Spatialized Sound FX at a Spook House, Jan./Feb. 2002 Live Sound International, Morsonic Sound Direction, True Tracking Technology, Product Report, Section 5—References 050131, pp. 5-9 to 5-12, Jan. 31, 2005.

Lambert, M. "The Console-Workstation Interface", Mix Magazine, Primedia Business Magazines and Media, pp. 1 to 6, May 2004.

Fontana, R.J. et al., "Commercialization of an Ultra Wideband Precision Asset Location System", 2003 IEEE Conference on Ultra Wideband Systems and Technologies, pp. 1 to 6, Reston, VA, Nov. 2003.

Steggles, P. et al., "A Comparison of RF Tag Location Products for Real-World Applications", A Ubisense White Paper, Ubisense Limited, pp. 1 to 14, Cambridge, U.K., Mar. 2004.

Ward, A. et al., "Local Positioning Systems—Technology Overview and Applications", Ubisense White Paper, Ubisense Limited, pp. 1 to 11, Cambridge, U.K., Sep. 2003.

Whittaker, R., "Successful Sound Reinforcement in Arena Opera—A Case Study", TiMax Application Notes Madam Butterfly Arena Opera, http://www.outboard.co.uk./pdf/TiMaxapps/AppNoteButterfly.pdf, Feb. 2003.

Whittaker, R., "Optimising Audio Imaging and Surround Sound for Auditoriums, Events and Themed Environments", TiMax Source-Oriented Reinforcement Technical Essay, http://www.outboard.co.uk./pdf/TiMaxinfo/SOR%20TechPaper.pdf, Nov. 28, 2002.

* cited by examiner

SYSTEM AND METHOD FOR REAL TIME EFFECTS AUTOMATION

This application claims the benefit under 35 U.S.C. 119(e) of U.S. Provisional Patent Application No. 60/582,974, filed Jun. 28, 2004.

FIELD OF THE INVENTION

This invention relates generally to the field of effects management and more particularly to real time effects automation.

BACKGROUND OF THE INVENTION

Live presentations or performances typically utilize static sound and/or lighting effect systems that do not utilize the positional location of sound and lighting cues emanating from a performer. For example, an actor may walk back and forth across the stage, but his dialogue will be amplified equally from both sides of the sound system.

In order to achieve a realistic representation of sound and lighting effects as a performer moves within an effects space, an operator must manipulate the controls of a sound and/or lighting effects system. The manual manipulation of the controls can provide a desired output balance within the speaker and/or lighting array in real time that relates to the movement of performers and objects on stage. Based on various stage cues, the operator manually configures the knobs and sliders on a mixing console to achieve the desired effect. However, the resultant positioning will be artificial and relevant only from the operator's perspective.

More advanced mixing consoles and software facilitate easier control by means of a joystick or user controlled software. In even more advanced systems, sound, lighting, and other effect cues can be pre-programmed as a sequence of effects, and then cued by the mixer operator or stage manager at the correct time to match the performer's movements. As such, performers must synchronize their actions and movements to the pre-recorded sequence of effects. Thus, while the system provides for more engaging effects, it requires each cue to be timed perfectly, demanding a significant amount of concentration by the mixer operator and performer during the performance.

SUMMARY OF THE INVENTION

The invention provides in one aspect, an effects automation system for generating control data for the control of first and second effects devices, based on the relative position of a mobile target, the system comprising:

(a) a first stationary receiver and a second stationary receiver for receiving signals and transmitting data;

(b) a first stationary transmitter tag and a second stationary transmitter tag, said first and second stationary transmitter tags for transmitting signals to the first and second stationary receivers;

(c) a mobile transmitter tag coupled to the mobile target, said mobile transmitter tag for transmitting signals to the first and second stationary receivers;

(d) a processing hub in data communication with the first and second stationary receivers for determining a first relative position value for the first stationary receiver and a second relative position value for the second stationary receiver, said processing hub including:

(I) a memory for storing said first and second relative position values;

(II) a processor coupled to the memory for:

(A) receiving data from the first and second stationary receivers that corresponds to the signals transmitted by the stationary transmitter tags and the mobile transmitter tag;

(B) utilizing the data that corresponds to signals transmitted by the first and second stationary transmitter tags to determine the relative distance between the first and second stationary receivers;

(C) utilizing the data that corresponds to signals transmitted by the mobile transmitter tag and the data that corresponds to signals transmitted by the first and second stationary transmitter tags to determine the relative distances between the mobile target and each of the first and second stationary receivers;

(D) determining the first and second relative position values based on the relative distances determined in (B) and (C), where the first relative position value corresponds to the proportion of the relative distance between the first and second stationary receivers associated with the mobile target and the second stationary receiver and where the second relative position value corresponds to the proportion of the relative distance between the first and second stationary receivers associated with the mobile target and the first stationary receiver; and (E) utilizing the first and second relative position values to generate the control data for control of the first and second effects devices.

The invention provides in another aspect, a method for generating control data for the control of first and second effects devices based on the relative position of a mobile target, wherein first and second transmitter tags and a mobile transmitter tag are used to transmit signals to first and second stationary receivers, the method comprising:

(a) receiving data from the first and second stationary receivers that corresponds to the signals transmitted by the stationary transmitter tags and the mobile transmitter tag;

(b) utilizing the data that corresponds to signals transmitted by the first and second stationary transmitter tags to determine the relative distance between the first and second stationary receivers;

(c) utilizing the data that corresponds to signals transmitted by the mobile transmitter tag and the data that corresponds to signals transmitted by the first and second stationary transmitter tags to determine the relative distances between the mobile target and the first and second stationary receivers;

(d) determining the first and second relative position values based on the relative distances determined in (b) and (c), where the first relative position value corresponds to the proportion of the relative distance between the first and second stationary receivers associated with the mobile target and the second stationary receiver and where the second relative position value corresponds to the proportion of the relative distance between the first and second stationary receivers associated with the mobile target and the first stationary receiver; and (e) utilizing the first and second relative position values to generate the control data for control of the first and second effects devices.

Further aspects and advantages of the invention will appear from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show some examples of the present invention, and in which.

Figure 1:
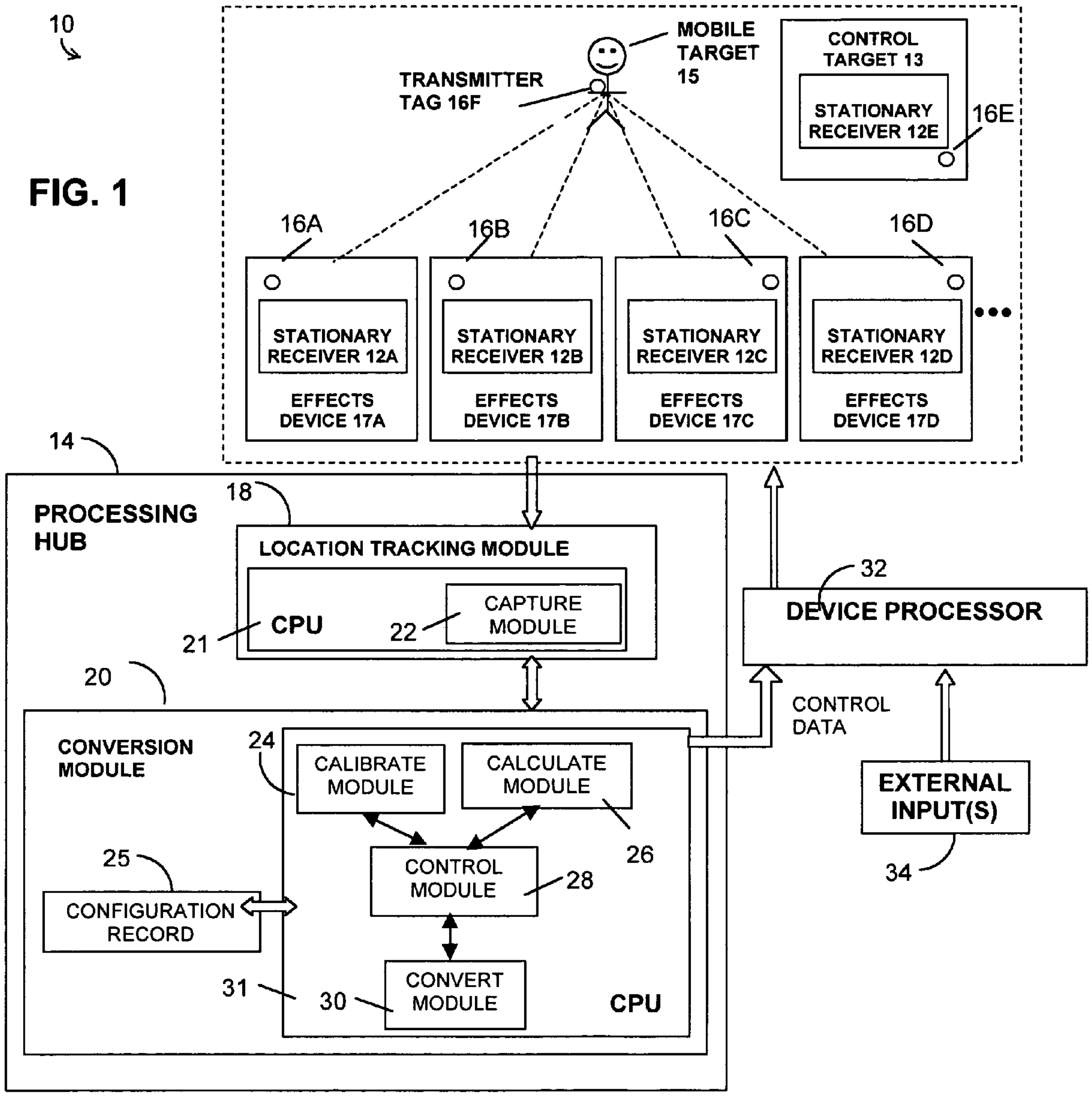
FIG. 1 is a schematic diagram of an example implementation of the effects automation system of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Reference is first made to FIG. 1, which illustrates the effects automation system 10 made in accordance with a preferred embodiment of the present invention. The effects automation system 10 includes a plurality of stationary receivers 12A, 12B, 12C, and 12D, a plurality of transmitter tags 16A, 16B, 16C, 16D, and 16F, a plurality of effects devices 17A, 17B, 17C, and 17D, a mobile target 15, a processing hub 14, and a device processor 32. The system may also include a control target 13 coupled with a transmitter tag 16E and a stationary receiver 12E when implementing the plurality of effects devices 17 in a duplicated array configuration. The effects automation system 10 tracks the movement in real time of a mobile target 15 to generate control data. External inputs 34 are provided to the device processor 32 along with the control data generated by the processing hub unit 14.

The transmitter tags 16 are mounted on the various components of the effects automation system 10, including the mobile target 15, the stationary receivers 12 and the control target 13 (optional) and transmit signals to the stationary receivers 12A, 12B, 12C, 12D and 12E (optional). Transmitter tags 16 are preferably ultra wideband (UWB) transmitters that transmit time difference of arrival (TDOA) timing pulses. The TDOA timing pulses can be used to determine the relative location of the mobile target 15 in relation to each of the stationary receivers 12A, 12B, 12C, 12D, and 12E. The transmitter tags 16 are also preferably radio frequency (RF) transmitters, each transmitting a unique radio frequency identification (RFID) indicating whether it is a mobile or a stationary transmitter tag, and its identification number. The RF tracking sensor consists of a small lightweight transmitter with a transmitting antenna located on the mobile target 15 to be tracked. For simplicity, FIG. 1 shows only six such transmitter tags 16A, 16B, 16C, 16D, 16E and 16F, but the effects automation system 10 may utilize more or less than six.

The stationary receivers 12 may each be positioned in any location within the three-dimensional effects space, but are preferably coupled to the effects devices 17 or the control target 13. For example, the stationary receivers 12 may be configured in a linear array at the perimeter of the three-dimensional space. Each stationary receiver 12A, 12B, 12C, 12D, and 12E has a transmitter tag 16A, 16B, 16C, 16D, and 16E affixed to it with a unique RFID indicating both that it is a stationary receiver and its unique identification number. For simplicity, FIG. 1 shows only four such stationary receivers 12, but a typical embodiment may utilize more or less than four.

It should be understood that transmitter tags 16 and stationary receivers 12 can be implemented using any commercially available tracking system that provides data relating to time difference of arrival (TDOA) or angle measurements, from which relative location data can be obtained. For example, the transmitter and receiver configuration of PAL 650™ Precision Asset Location System™ (manufactured by Multispectral Solutions Inc. of Maryland, U.S.) and disclosed in U.S. Pat. No. 6,882,315 to Richley et al. (hereby incorporated by reference) uses a set of transmitter tags 16 that transmit RF pulses to a set of stationary receivers 12 (monitoring stations) and generates related TDOA information. However, it should be understood that the present system is not limited to this kind of positional tracking technology, and that any positional tracking system may be implemented under the appropriate conditions.

The effects devices 17 may be located at any position within a three-dimensional effect space but are preferably coupled to the stationary receivers 12. The effects devices 17 are any devices that can be automated by means of external input data including such devices as speakers, lights, lasers, stage machinery, motors, visual displays, film projection systems, computer presentations, animatronics, fog machines, smoke machines, fire systems, water systems, pyrotechnics, show control systems, and other special effects devices. Effects automation system 10 operates so that output from the effects devices 17 is based on the relative position of the mobile target 15 in the effect space. For simplicity, FIG. 1 shows only four effects devices 17, but a typical embodiment may utilize more or less than four.

The mobile target 15 generally represents a performer or other moving object in a live event. Effects automation system 10, generates a set of dynamically calculated values that are assigned to the effects devices 17, based on the location of the mobile target 15. Each mobile target 15 has a transmitter tag 16F affixed to it with a unique RFID indicating both that it is a mobile target and its unique identification number. For simplicity, FIG. 1 shows only one such mobile target 15, but a typical embodiment may utilize more than one. To facilitate a system with multiple mobile targets 15, the calculation process is repeated wherein multiple sets of values are assigned to the effects devices 17, for and in relation to each mobile target.

The processing hub 14 contains the location tracking module 18 and the conversion module 20, and determines the relative position of each mobile target 15 relative to each stationary receiver 12A, 12B, 12C, 12D, and 12E. While processing hub 14 is shown in FIG. 1 to be a separate device in effects automation system 10, it should be understood that processing hub 14 could be implemented and physically located within one or a plurality of stationary receivers 12, or within any other element of effects automation system 10. The processing hub 14 collects spatial relative position data from the stationary receivers 12 and outputs control data to the device processor 32 for automation control of the effects devices 17.

In the preferred embodiment, the processing hub 14 is connected by category 5 (CAT5) cable to the stationary receivers 12 in a daisy-chain manner. However, it should be understood that many alternative means of establishing a connection could be utilized (e.g. wireless connection). Finally, in the preferred embodiment, the processing hub 14 is connected to the device processor 32 by commercially available means (e.g. MIDI cable, DMX 512 connection, or serial (RS-232) connection, etc.) The location tracking module 18 consists of a location tracking processor 21 which executes the process steps of a capture module 22. In a preferred example implementation, the location tracking module 18 determines the transmitter tag 16 positions in real time via TDOA measurements of the RF signals sent by the transmitter tags 16 detected by the stationary receivers 12. However, the effects automation system 10 is not limited to this kind of positional tracking approach, and any positional tracking system may be implemented, wherein a receiver element or an array of receiver elements can be utilized in order to calculate a measure of distance between at least one stationary receiver 12 and at least one transmitter tag 16.

The conversion module 20 consists of a conversion processor 31, and an associated configuration record 25 stored in memory that holds the relative position values of the stationary receivers 12, control target 13, and mobile target 15. The conversion processor 31 is coupled to the configuration record 25, and consists of the calibrate module 24, calculate module 26, control module 28, and convert module 30.

The calibrate module 24 is responsible for system calibration, activating the capture module 22 of the location tracking module 18 to obtain relative distance measurements between each of the plurality of effects devices 17 and the control target 13. Each stationary receiver's transmitter tag 16A, 16B, 16C, 16D, and 16E transmits a signal to each of the stationary receivers 12A, 12B, 12C, 12D, and 12E. The calibrate module 24 within processing hub 14 obtains this information and places it in the configuration record 25. It should be understood that the calibration procedure is optional, and that the effects automation system 10 could be operated in an alternate implementation where the stationary receiver's 12 location information is pre-determined and where the calibrate module 24 is not needed, as will be discussed.

The convert module 30 uses the signals received by the stationary receivers 12A, 12B, 12C, 12D, and 12E to determine relative distance measurements based on the relative locations of the transmitter tag 16F corresponding to the mobile target 15. Based on the relative distance measurements determined by the convert module 30, the calculate module 26 determines the relative distance between the mobile target 15, the plurality of stationary receivers 12, and the control target 13. Control data for the automation control of the effects devices 17 is generated by the control module 28 for output to the device processor 32 by the convert module 30. In one example implementation, the conversion module 20 is implemented using a microcontroller that is capable of completing all necessary calculation steps rapidly enough for real time control.

The external inputs 34 represent a separate control data stream (i.e. live or pre-recorded stage cues) that is combined with the real time performance control data generated by the processing hub 14 via the device processor 32 for effect automation of the effects devices 17. The device processor 32 can be implemented using any existing or custom configured device processor that can facilitate external control automation.

Figure 2:
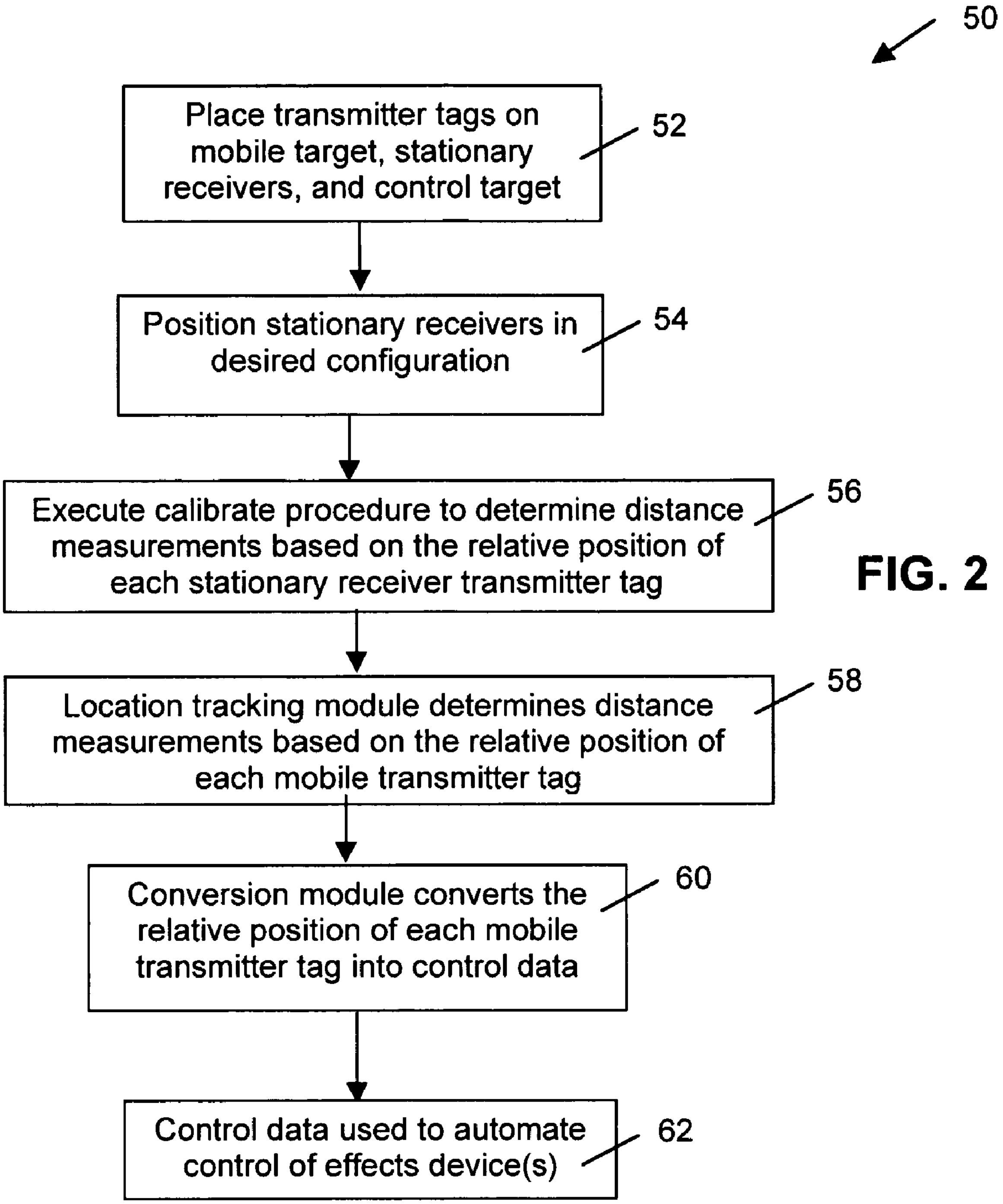
FIG. 2 is a flowchart illustrating the general process steps conducted by the effects automation system of FIG. 1.

Referring now to FIGS. 1 and 2, the basic operational steps 50 conducted by the effects automation system 10 are illustrated. At step (52), the transmitter tags 16 are attached to the mobile target 15, to the control target 13 (optional), and to each stationary receiver 12A, 12B, 12C, and 12D for position tracking. This can be accomplished using conventional adhesion methods (e.g. textile apparatus (i.e. wearable), glue, Velcro, etc.)

At step (54), each stationary receiver 12A, 12B, 12C, 12D, and 12E and its corresponding transmitter tag 16A, 16B, 16C, 16D, and 16E are positioned in a desired configuration in the three-dimensional effects space, preferably corresponding to the placement of the effects devices 17. At step (56), the calibrate module 24 of the conversion module 20 executes the calibrate procedure which calibrates the effects automation system 10 for the particular configuration of stationary receivers 12. At step (58), the location tracking module 18 determines distance measurements based on the relative position of each mobile transmitter tag 16. At step (60), the conversion module 20 converts the distance measurements based on the relative position of each mobile transmitter tag 16 into control data. At step (62), the control data is used for the automation control of effects devices 17 and is output to a device processor 32 for application to external inputs 34.

Figure 3A:
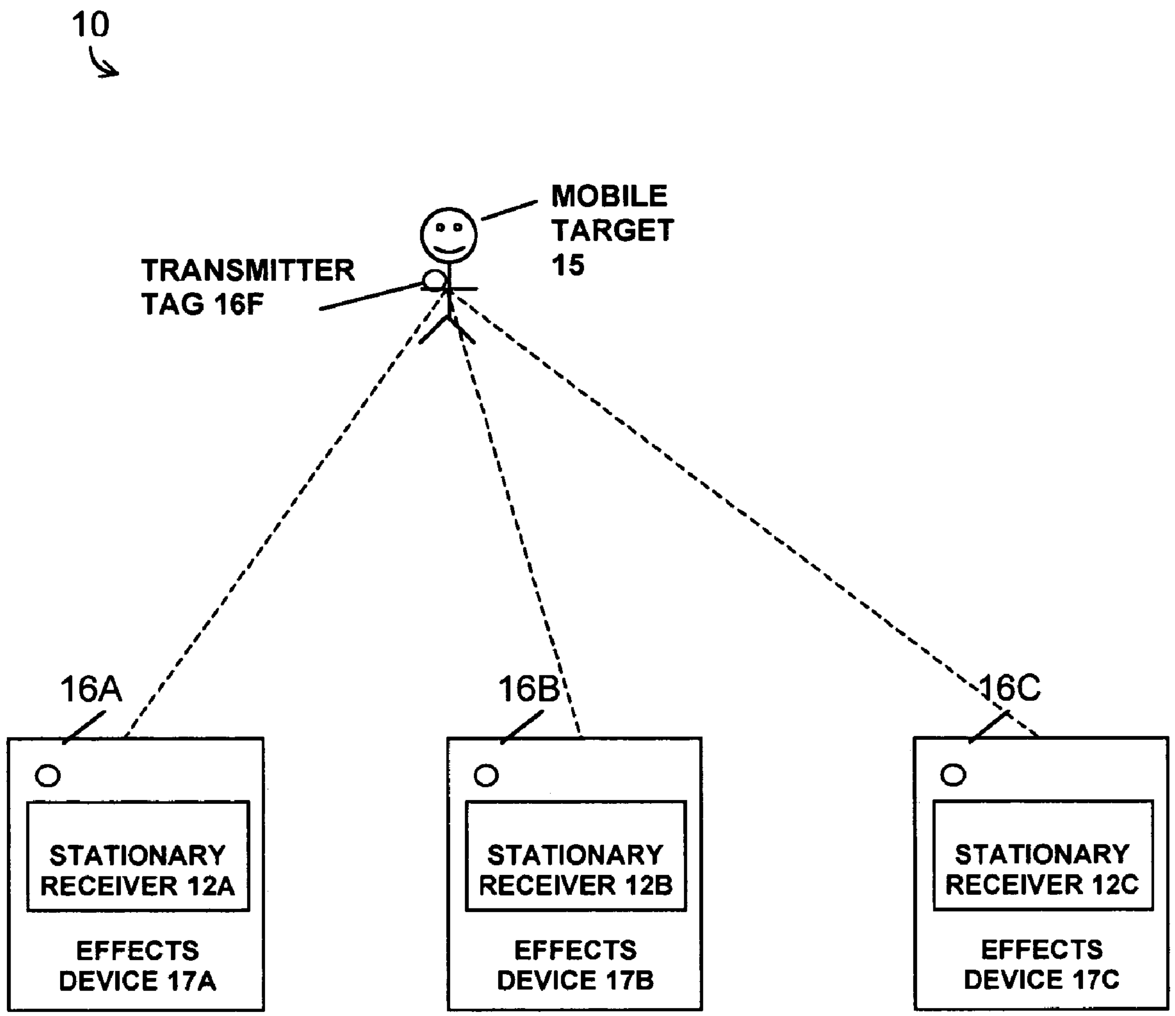
FIG. 3A is a schematic diagram illustrating a sample positioning option of the effects automation system of FIG. 1, involving point-to-point calculations.
Figure 3B:
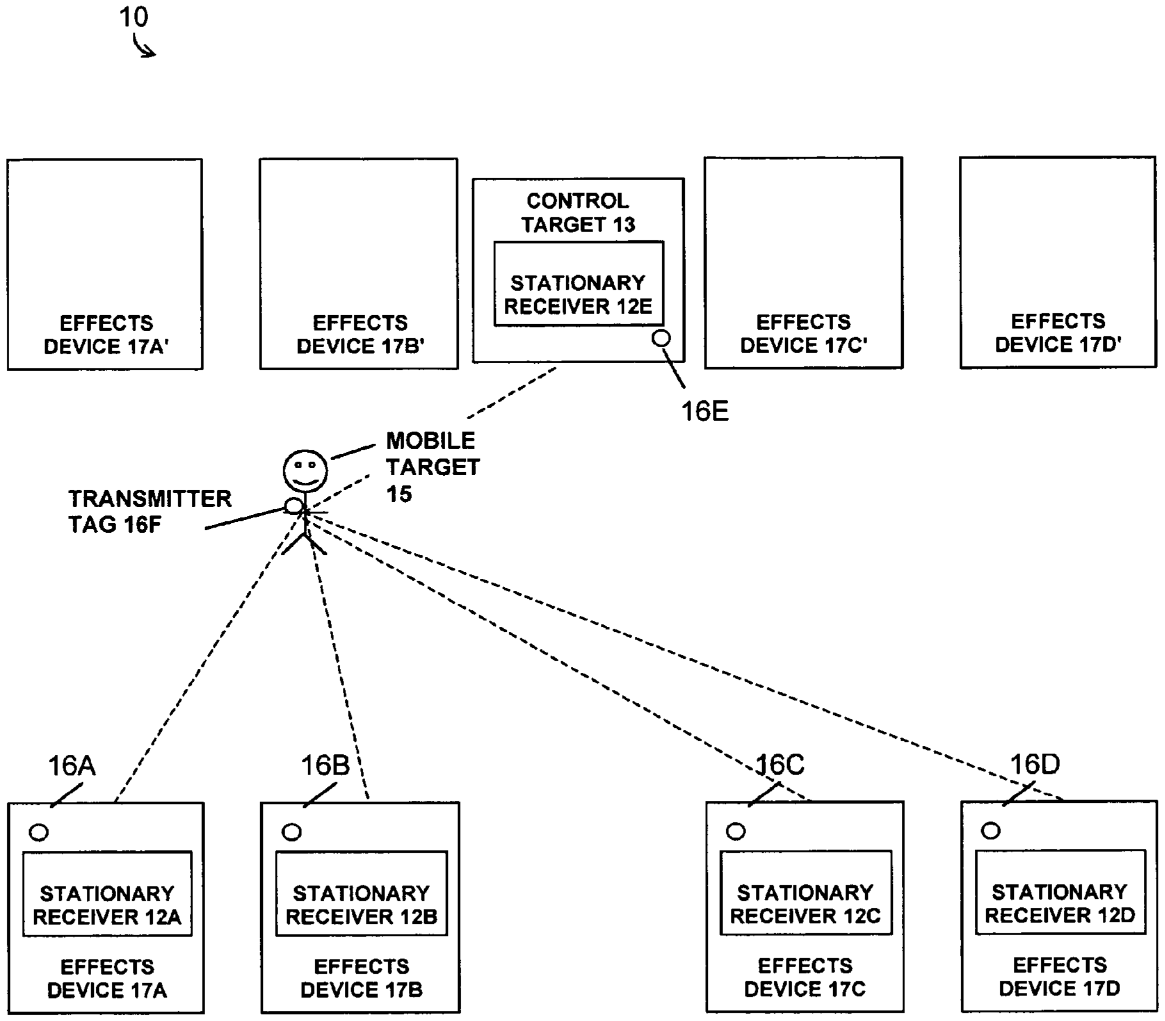
FIG. 3B is a schematic diagram illustrating a sample positioning option of the effects automation system of FIG. 1, involving point-to-line calculations.

FIGS. 3A and 3B illustrate two example implementations of the effects automation system 10. Specifically, FIG. 3A shows the effects automation system 10 in a point-to-point configuration and FIG. 3B shows the effects automation system 10 in a point-to-line configuration. It is contemplated that the user will be able to select which variety through the user interface of the processing hub unit 14 as will be discussed.

In FIG. 3A, the mobile target 15 and corresponding transmitter tag 16F is considered with reference to each stationary receiver 12A, 12B, and 12C, and corresponding transmitter tag 16A, 16B, and 16C in a point-to-point manner. Control data is preferably calculated individually for each stationary receiver 12A, 12B, and 12C, following one of two approaches, namely a Type I or Type II determination. The Type I determination is most appropriate when the effects devices 17 are placed in a symmetrical or linear configuration. The Type II determination is useful when the effects devices 17 are not placed in a symmetrical or mirrored configuration relative to each other.

In FIG. 3B, the mobile target 15 and corresponding transmitter tag 16F is considered with reference to the control target 13 and corresponding transmitter tag 16E and stationary receiver 12E, lined up along an array of a number of effects devices 17A', 17B', 17C', and 17D' mirroring the configurations of effects devices 17A, 17B, 17C, and 17D with corresponding stationary receivers 12A, 12B, 12C, and 12D and transmitter tags 16A, 16B, 16C, and 16D in a mirror-type of effect. This is a valuable application in that a line array of a large number of effects devices 17A, 17B, 17C, and 17D can be duplicated while maintaining a relative balance between the duplicated array of effects devices 17A', 17B', 17C', and 17D' and the original array.

This is a more economic solution than repeating the point-to-point calculations for each controllable device 17A', 17B', 17C', and 17D' in the duplicated line array, and it saves the necessity for additional stationary receivers 12 and transmitter tags 16, for the trade-off of requiring only a few extra calculation steps. For example, a single row of four receivers could control several rows of speakers in the same configuration in any dimension, by mirroring the speaker configuration so that outputs may be controlled separately. Another example is in the case of divisive behavior control, where part of the system configuration behaves differently from others, reacting dynamically in master-slave situations or differently to location data.

Figure 4A:
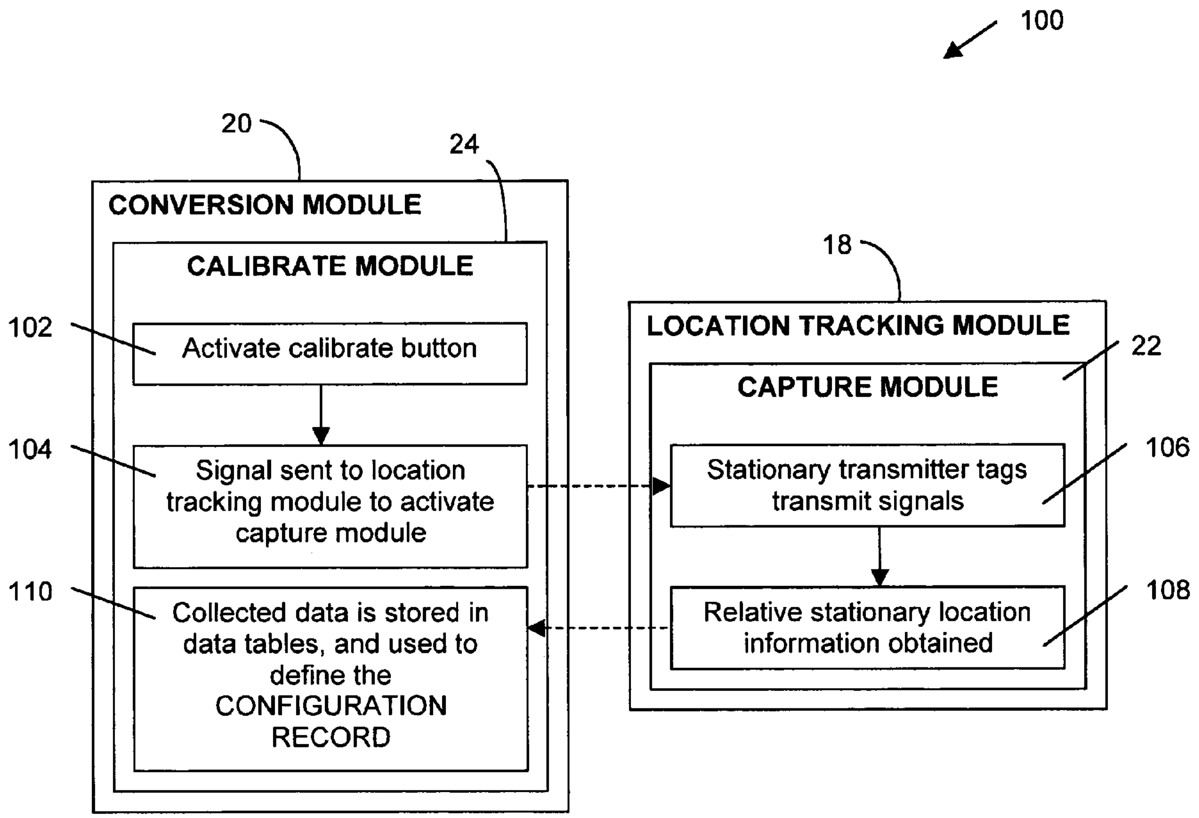
FIG. 4A is a flowchart illustrating the process steps conducted by the calibrate and capture modules of the conversion and location tracking modules respectively, during the calibration stage in the operation of the effects automation system of FIG. 1.

FIG. 4A is a flowchart illustrating in graphical form the process steps 100 conducted by the calibrate module 24 and the capture module 22 of the conversion module 20 and location tracking module 18 respectively, during the calibration stage of the effects automation system 10. Once a user requests system calibration, it occurs automatically based on the system processor's timing and update rate, which may range from less than 0.1 to 3 seconds, without the requirement for any further manual input by the user.

At step (102), the calibrate button is activated by the user on the user interface of the processing hub 14 for calibration of the effects automation system 10. At step (104), a signal is sent from the calibrate module 24 of the conversion module 20 to the location tracking module 18 to activate its capture module 22. At step (106), the stationary transmitter tags 16A, 16B, 16C, 16D, and 16E associated with the stationary receivers 12A, 12B, 12C, 12D, and 12E transmit RF signals to all other stationary receiver units 12. At step (108), relative location information is obtained by the capture module 22 from each stationary receiver unit 12.

At step (110), the collected data is stored and defined into a configuration record 25 where it can be quickly accessed later by the conversion module 20. Data collected at this stage includes: (1) the number of stationary receiver units, and (2) the relative distance measurement between each stationary receiver unit measured in unspecified units (i.e. raw signal TDOA measurements). Where the stationary receivers 12 are in a mobile configuration (i.e. enabled using wireless technology), it is possible to bypass the configuration record 25, as the subsequent data processing will then take place dynamically.

In an alternate implementation of the effects automation system 10, an existing off the shelf tracking system such as the PAL 650™ Precision Asset Location System™ (manufactured by Multispectral Solutions Inc. of Maryland, U.S.) can be incorporated where the distance measurements of the stationary receivers in the three-dimensional effects space can be manually entered into the associated software. Referring to FIG. 4A, the transmitter tags 16 can be used in turn to measure the spatial relative location of each of these receivers, thereby removing the need to execute steps (102), (104), (106), and (108). The data inputted into the associated software becomes the collected which is stored into the data tables and used to define the configuration record 25 at step (110).

Figure 4B:
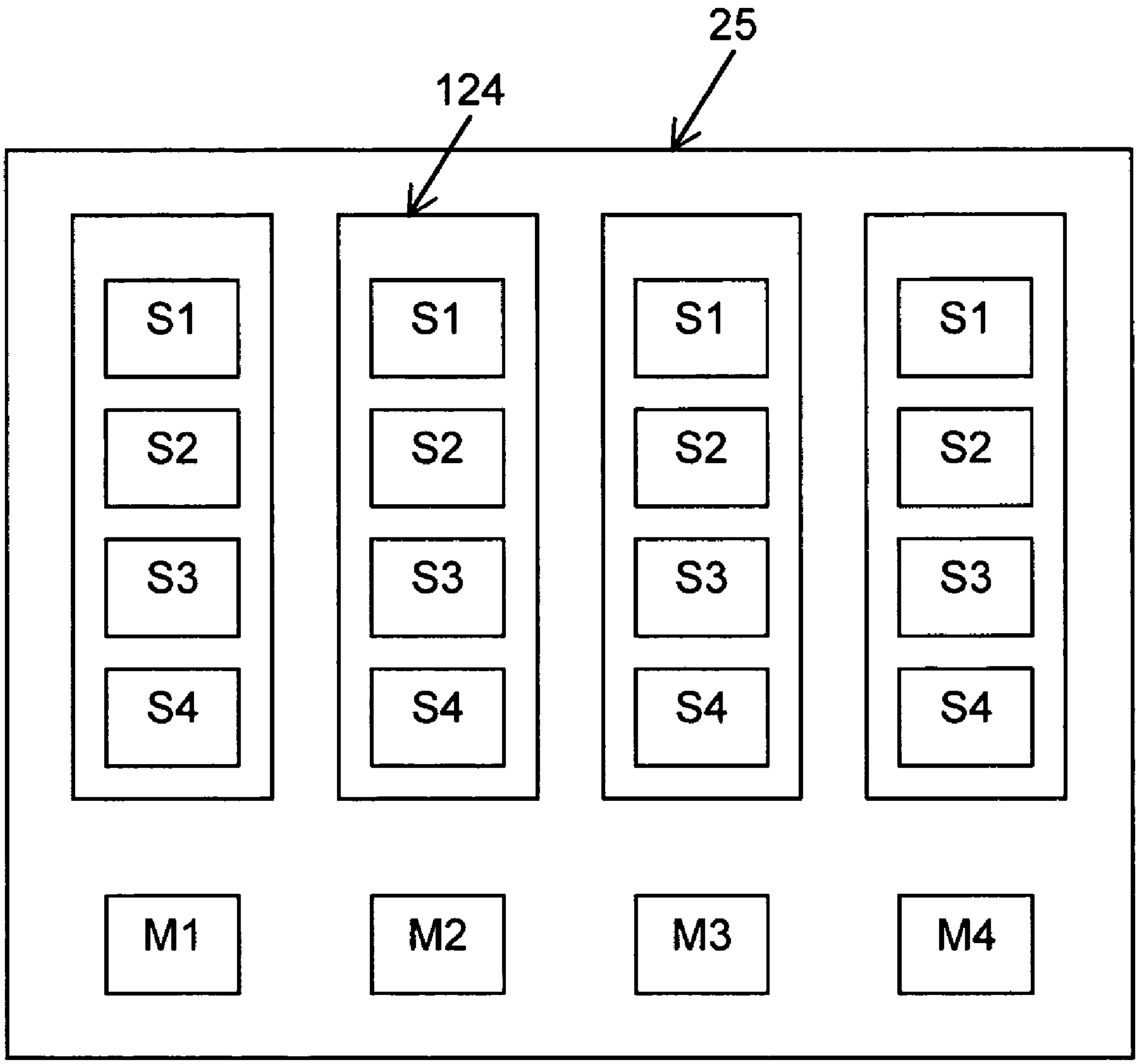
FIG. 4B is a schematic diagram illustrating the configuration record within the conversion module of the effects automation system of FIG. 1.
Figure 4C:
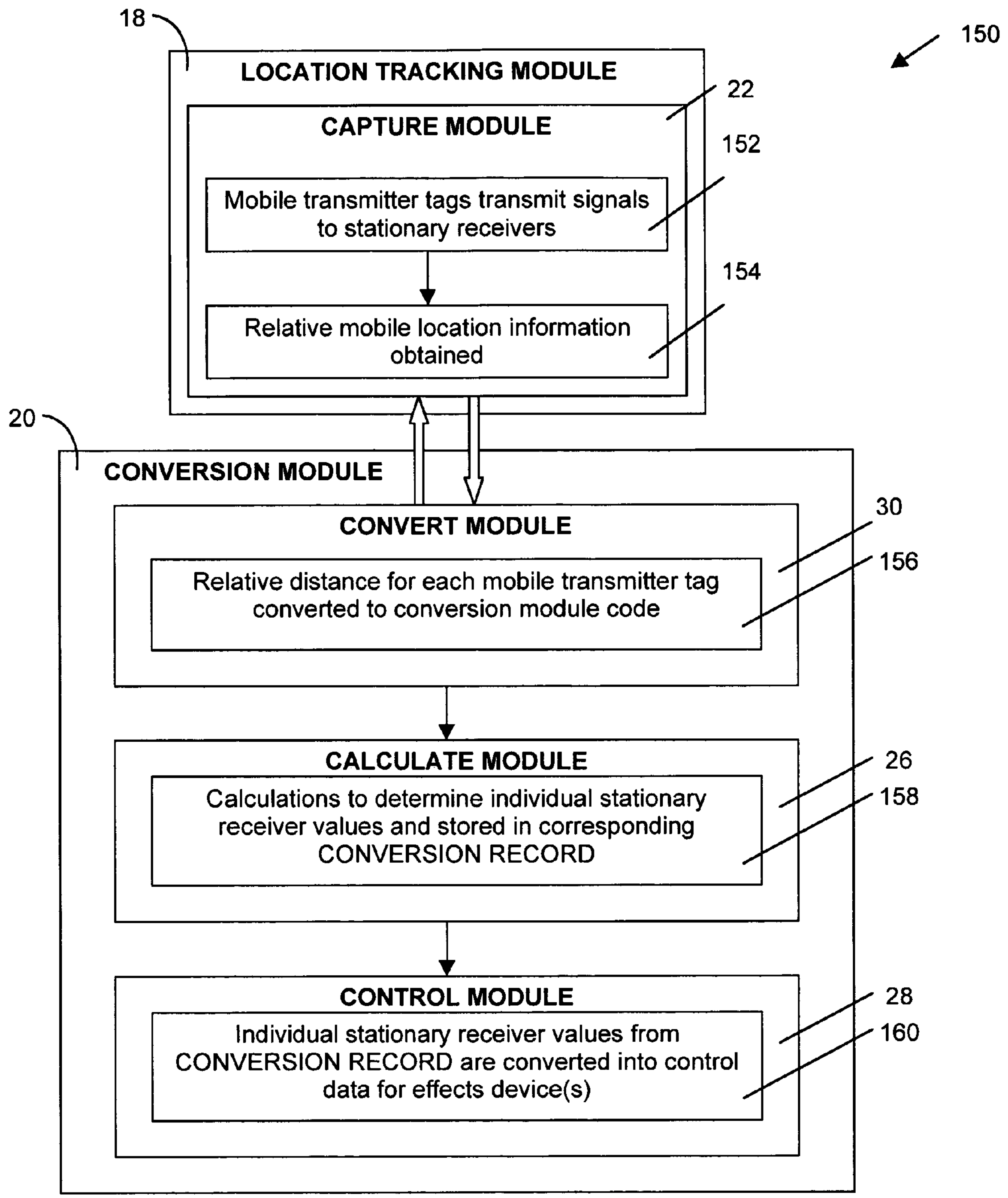
FIG. 4C is a flowchart illustrating the process steps conducted by the convert, calculate, and control modules within the conversion module of the effects automation system of FIG. 1.

FIG. 4B is a schematic diagram illustrating the configuration record 25 as determined by the calibrate module 24, which contains a number of conversion records 124. The configuration record 25 shown is for an effects automation system 10 that utilizes four mobile targets 15 (M1, M2, M3 and M4) and four stationary receivers 12 (S1, S2, S3 and S4). As shown, four corresponding discreet conversion records 124 are created, one for each mobile target 15. Discrete stationary receiver values are calculated for each conversion record 124. Each conversion record 124, represents the data provided by the stationary receivers 12, obtained from the transmitter tag 16 of each mobile target 15, and converted into control data for each corresponding stationary receiver 12 and associated effects devices 17. FIG. 4C is a flowchart illustrating the process steps 150 conducted by the capture module 22, the convert module 30, calculate module 26, and control module 28 within the conversion module 20 in the regular (i.e. non-calibration) operation of the effects automation system 10. The process steps 150 can occur automatically in real time, and do not require manual intervention by an operator.

At step (152), the mobile transmitter tag 16F of the mobile target 15 transmits RF signals to the stationary receivers 12A, 12B, 12C, 12D and 12E. At step (154), relative location information is obtained by the capture module 22 from each stationary receiver 12A, 12B, 12C, 12D and 12E.

At step (156), the convert module 30, uses the unspecified units received from the capture module 18. As discussed above, these unspecified units are relative measures of the distance between the mobile transmitter tag 16F associated with mobile target 15 and the stationary transmitter tags 16A, 16B, 16C and 16D associated with the effects devices 17A, 17B, 17C, 17D. This information is then converted into conversion module code.

At step (158), the calculate module 26 performs calculations on these converted values which represent relative distance measurement data. One of three, or a combination of the three determinations is applied: Type I (point-to-point), Type II (point-to-point), and general point-to-line calculations, resulting in percentage based control data for the automation control of the effects devices 17. These values are stored for each mobile target 15 in a corresponding conversion record 124. Once the values have been determined and stored in each conversion record 124, at step (160), the control module 28, takes the calculated values for each stationary receiver 12 and converts them into control data for the effects devices 17, based on user selected settings.

Figure 5A:
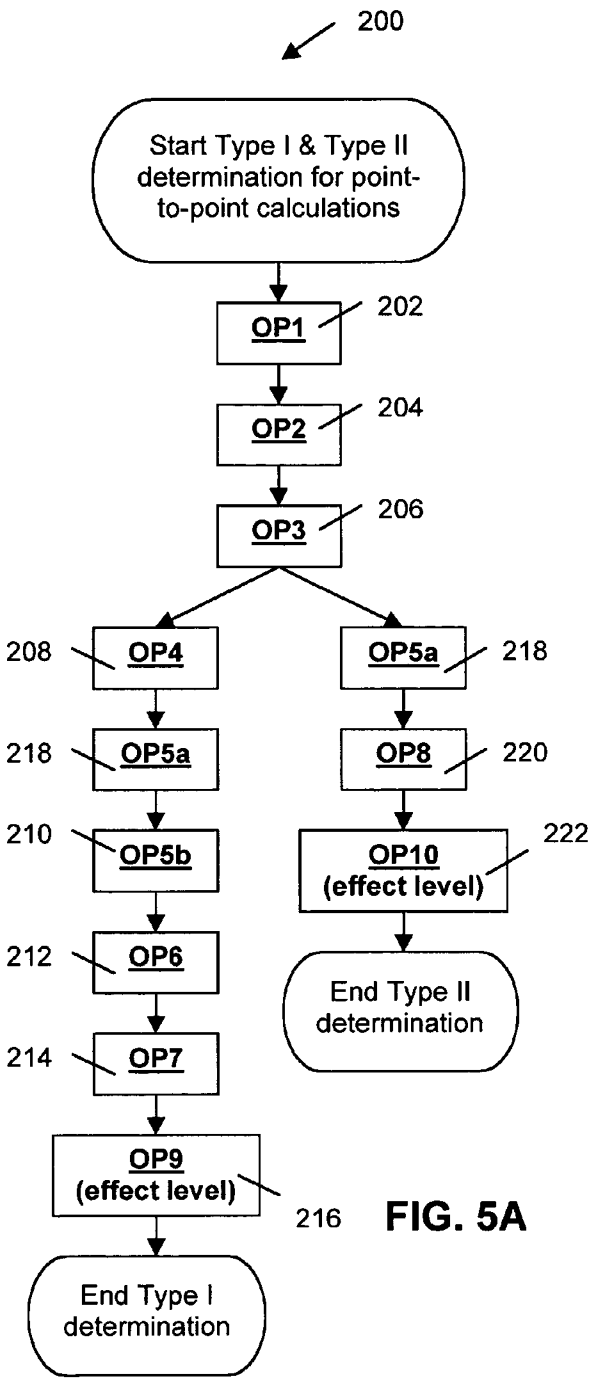
FIG. 5A is a flowchart illustrating the general process steps conducted by the calculate module for point-to-point calculations within the conversion module of the effects automation system of FIG. 1.

FIG. 5A illustrates the general process steps 200 for the Type I and Type II determinations of the point-to-point calculations executed by the conversion module 20 once the calibrate and tracking steps have been completed.

The Type I determination is for more precise determination of a relative location within a linear array, and encompasses the following operations: OP1 202, OP2 204, OP3 206, OP4 208, OP5*a* 218, OP5*b* 210, OP6 212, OP7 214, and OP9 (effect level) 216. According to this determination, the effects devices 17 far away from the mobile target 15 will be muted with the majority of effect emanating from the effects device 17 to the mobile target 15.

The Type II determination is for relative positioning within the boundaries of a linear, closed, or open array, and encompasses the following operations: OP1 202, OP2 204, OP3 206, OP5*a* 218, OP8 220, and OP10 (effect level) 222. According to this determination, the resultant levels for the effects devices 17 are relative to each other at any given time.

These two determination types can be advantageously used for different effects. For example, at a concert performance, the positional sound of a singer may be desired with moderate location-based effects, while maintaining amplification from the entire sound system as the mobile target 15 moves back and forth across the stage. This requires application of the Type II determination to the lead vocal audio channel. However, a lighting effect which uses a linear array of lights could be delivered with more focus on relative location (i.e. it may not be desirable to light the whole stage one at time). In such a situation, application of the Type I determination to the lighting cues is appropriate.

Figure 5B:
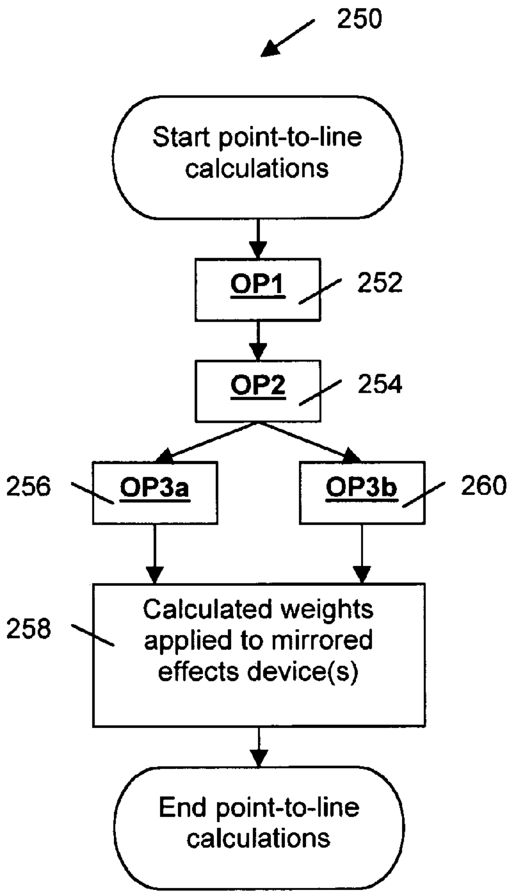
FIG. 5B is a flowchart illustrating the general process steps conducted by the calculate module for point-to-line calculations within the conversion module of the effects automation system of FIG. 1.

FIG. 5B illustrates the general process steps 250 for the point-to-line calculations, and encompasses the following operations: OP1 252, OP2 254, OP3*a* 256, and OP3*b* 260. The point-to-line calculations can be applied to situations requiring the accommodation of several mirroring arrays or the establishment of boundaries. After these operations have been performed, the calculated weights are then applied to the mirrored effects devices 17A', 17B', 17C', and 17D' shown in FIG. 3B.

Referring now to FIGS. 6A, 6B, 6C, 6D, 6E, 6F, 7A, and 7B, a percentage value is obtained based on point-to-point calculations through a determination of relative distances by trilateration methods, which uses known locations of two or more reference points, and the measured distance between an object and each reference point. It should be noted that while this example is being illustrated through the measurement of lines obtained from TDOA data, the same calculation results could be obtained using measurement of angles by triangulation methods.

Figure 7A:
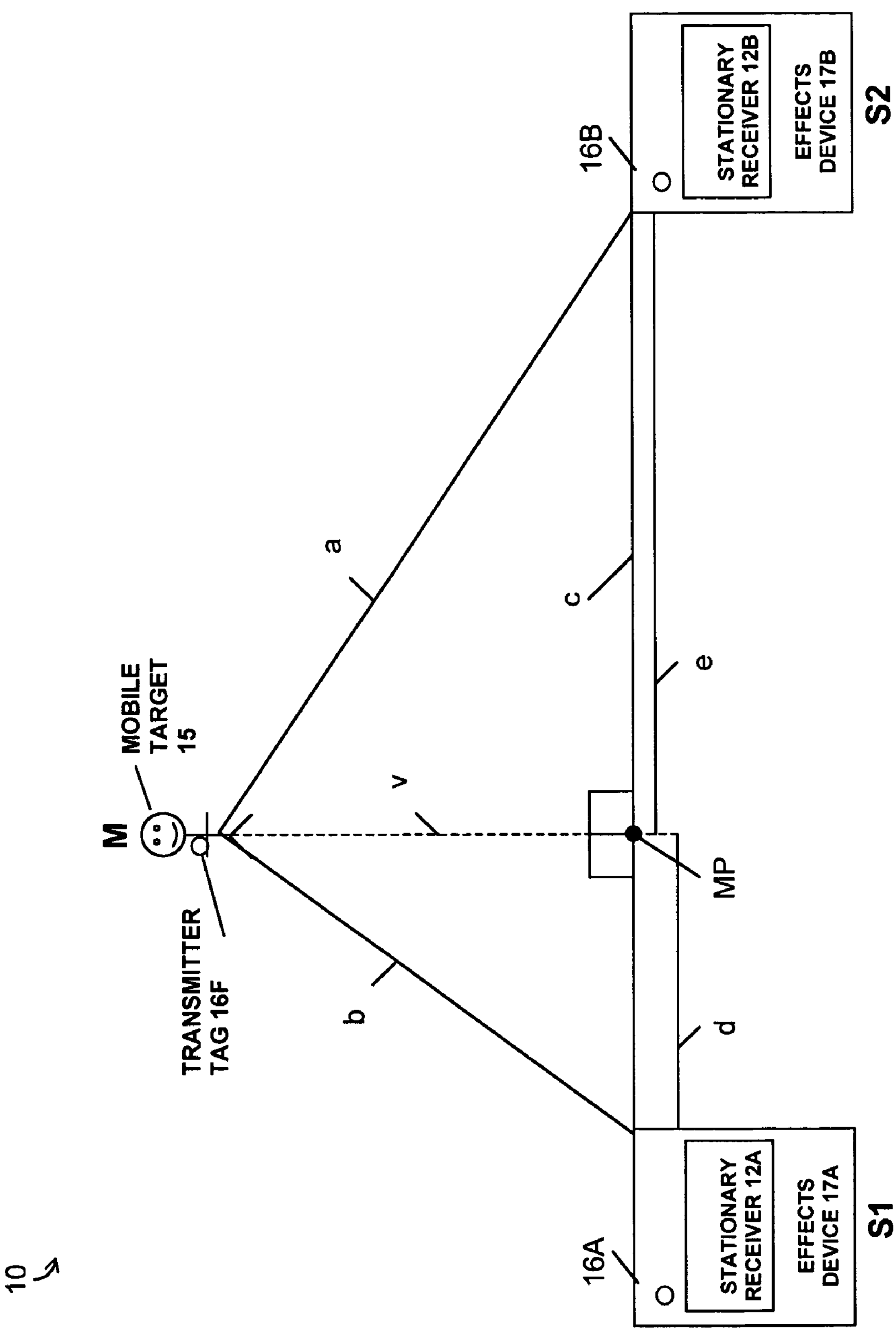
FIGS. 7A and 7B are schematic diagrams of the point-to-point calculations for various positions of the transmitter tags in relation to the stationary receivers of the effects automation system of FIG. 1.
Figure 7B:
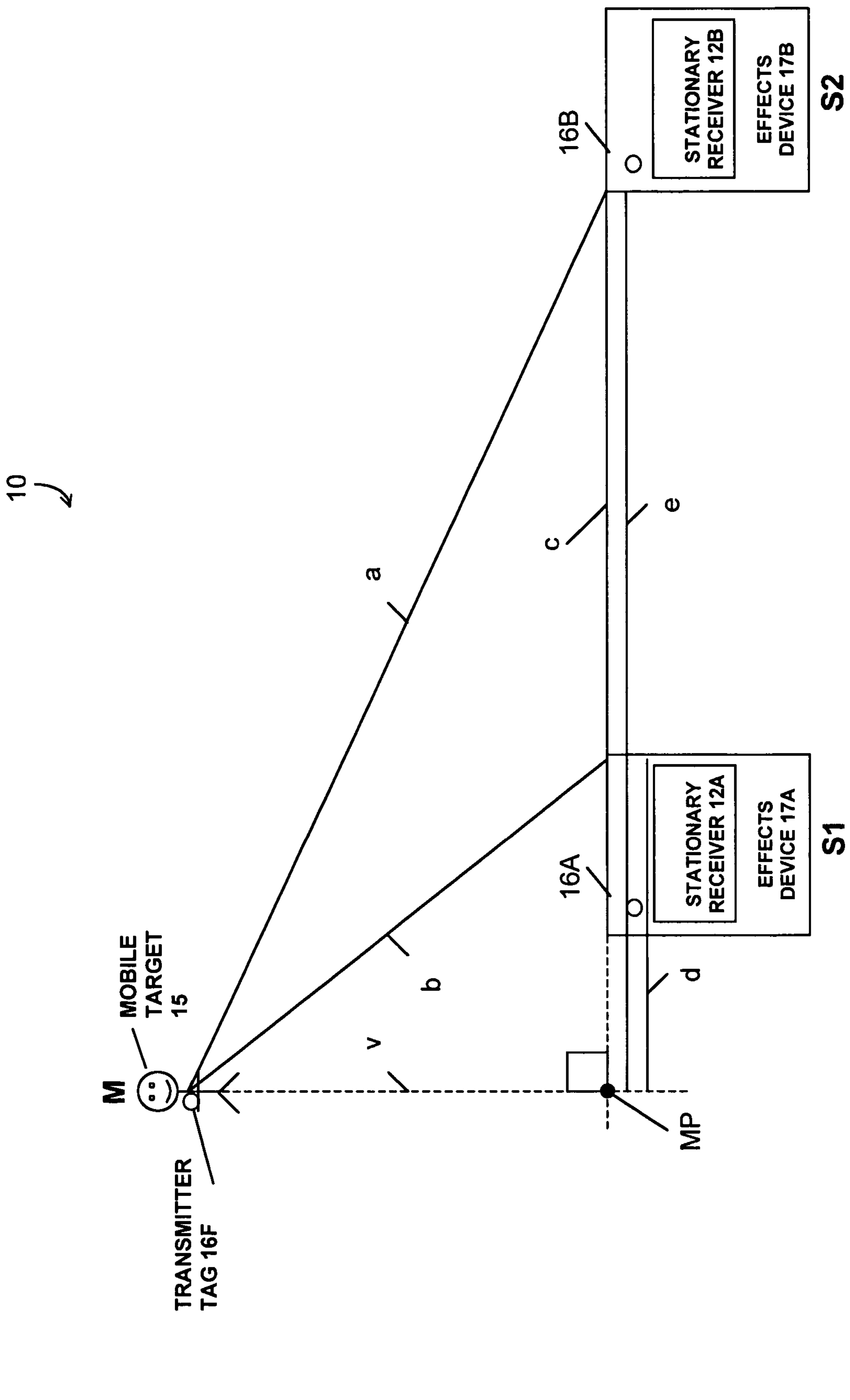

As shown in FIG. 7A, the mobile target 15 (M), is positioned in between the two stationary receivers 12 and effects devices 17A and 17B (S1 and S2). However, when as shown in FIG. 7B, the mobile target 15 (M), is not positioned in between the two effects devices 17A and 17B (S1 and S2), additional calculations must be done to ensure that the proper effect is obtained. In this situation, the desired effect is for the first stationary reference point (S1) to be at maximum percentage (100%) and the second stationary reference point (S2) to be at minimum percentage (0%), thus creating a system without boundaries, allowing the mobile target 15 to travel beyond the perimeter of the array of effects devices 17 without system interruption.

Figure 6A:
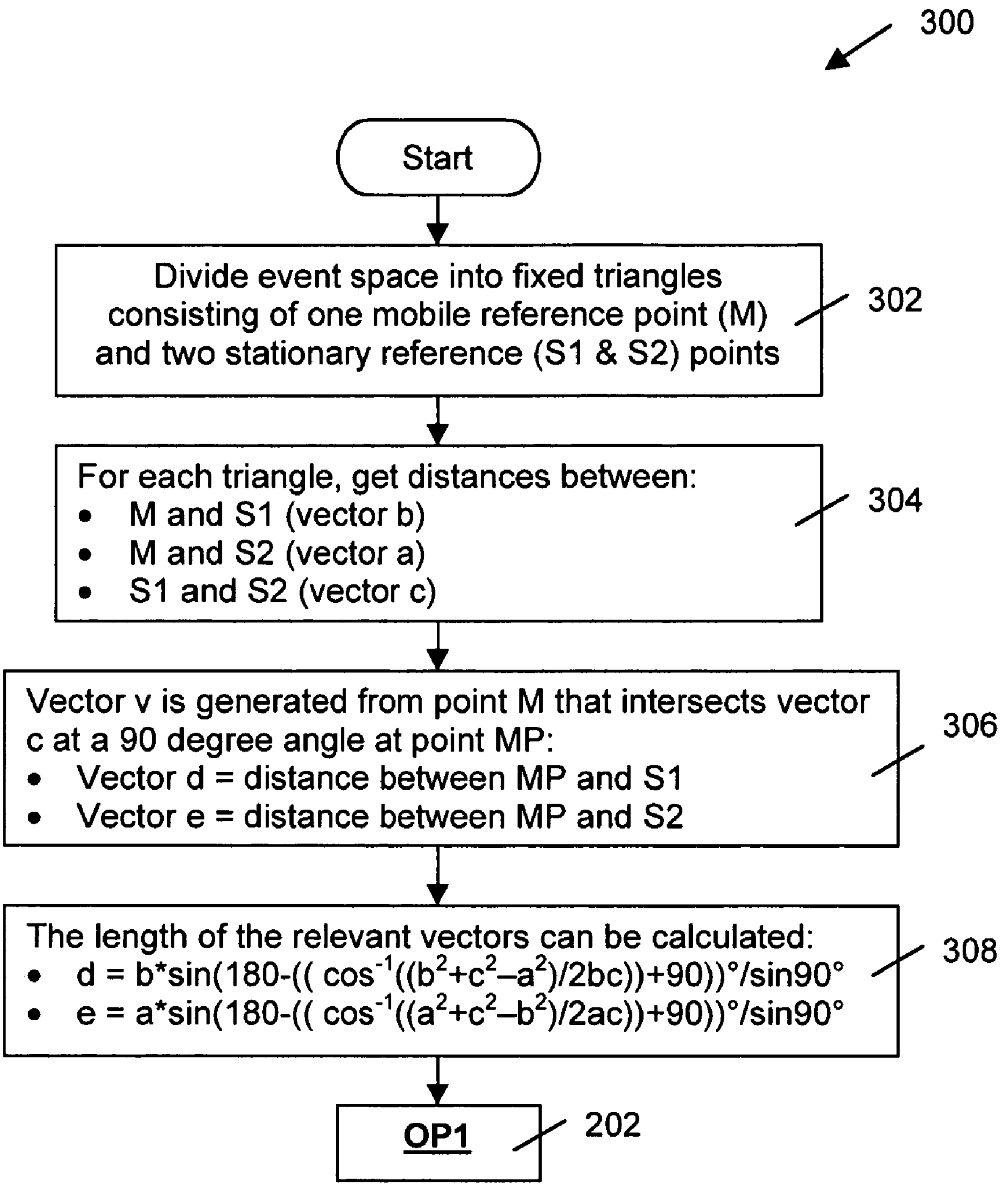
FIGS. 6A, 6B, 6C, 6D, 6E, and 6F are flowcharts illustrating the detailed process steps conducted by the calculate module for point-to-point calculations within the conversion module of the effects automation system of FIG. 1.

Referring to FIGS. 6A, 7A and 7B, the initial steps 300 in the point-to-point calculation is illustrated. First, at step (302), the three-dimensional effect space is divided into triangles consisting of one mobile target 15 (M) and two stationary receives and effects devices 17A and 17B (S1 and S2). These points will be identified as first and second stationary reference points S1 and S2. For each triangle, a number of vectors are obtained at step (304), namely vector c represents the distance between first stationary receiver 12A (S1) and the second stationary receiver 12B (S2), vector b represents the distance between the mobile target (M) and the first stationary receiver 12A (S1), and vector a represents the distance between the mobile target (M) and the second stationary receiver 12B (S2) (FIG. 7A).

At step (306), vector v is generated from the mobile target (M) and intersects vector c at a 90 degree angle at a point MP. The following additional vectors are obtained, namely vector d represents the distance between MP and the first stationary receiver 12A (S1) and vector e representing the distance between MP and the second stationary receiver 12B (S2). As conventionally known, where the lengths of vectors a, b, and c are known, the length of vectors d and e can be calculated by application of the sine and cosine laws at step (308). The vectors d and e are considered to be "the segments" of the associated triangle, and these vectors will be referred to as such in the following description.

Once these initial processing steps have occurred, the next step in the point-to-point calculations is OP1 202. Relative position values between more than two stationary receivers 12 (S1, S2, etc.) based on the positioning of the mobile target 15 (M) can be calculated by means of applying the above operations to each of the triangles in the three-dimensional effect space, in order to determine control data for each effects device 17.

Figure 6B:
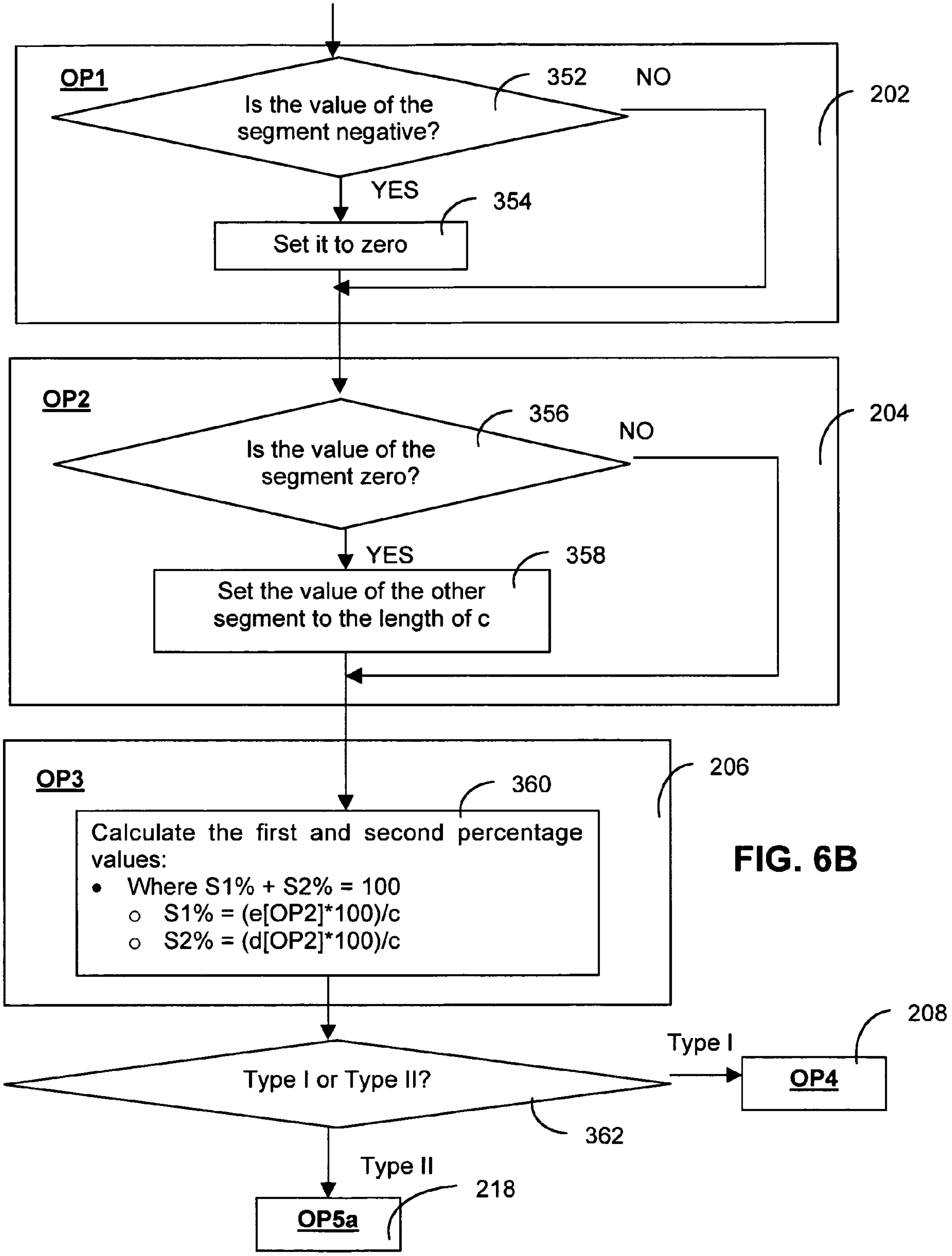

Referring to FIG. 6B, OP1 202, OP2 204, and OP3 206 are operations that are executed by conversion module 20 for all triangles in the point-to-point calculations for both Type I and Type II determinations. In particular, OP1 202 and OP2 204 handle the situation illustrated in FIG. 7B, where the triangle formed by the mobile target 15 (M) and two stationary receivers 12A and 12B (S1 and S2) is obtuse. The purpose of OP1 202 is to set any negative segment value within a triangle to zero and the other segment to the full value c.

At step (352), for all triangles, the value of each of the two (vector) segments is checked to be negative or not. If a segment is negative, then at step (354), the value of that segment is set to zero. Otherwise, the length of the segment remains its original value.

The purpose of OP2 204 is to set the value of a current segment to the length of vector c if the other segment's value is zero. At step (356), the value of the segment is checked to be zero or not. If so, at step (358), the value of the other segment is set to the length of vector c. Otherwise, the length of the vector segment remains its original value.

The purpose of OP3 206 is to calculate the first and second percentage values. At step (360), calculate module 26 determines an OP3 value for each stationary receiver 12 within each triangle. In this example implementation, the OP3 value is a percentage of the value of the full vector c. As indicated in FIGS. 6B, 7A, and 7B, the percentage value for stationary receiver 12A is related to the value of vector e and the percentage value for stationary receiver 12B is related to the value of vector d.

At this point, branching occurs at step (362) depending on whether the user has chosen to proceed with the Type I or Type II determinations. For the Type I determination, the calculations proceed to OP4 208, whereas for Type II determination, the calculations proceed to OP5*a* 218.

Figure 6C:
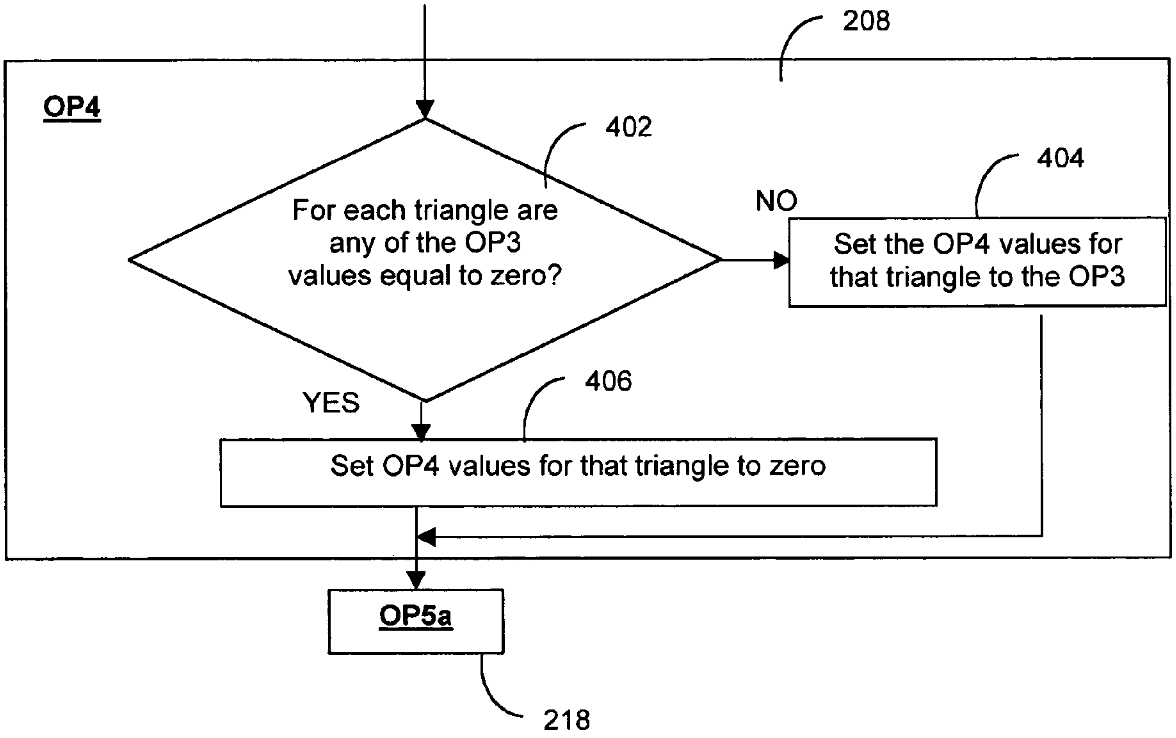

Referring to FIG. 6C, OP4 208 is only utilized for the Type I determination. OP4 208 is used in the situation where the mobile target (M) is positioned beyond the line array of a stationary receiver 12. In this case, any triangles associated with the stationary receiver in the three-dimensional effect space should not be used in further calculations. At step (402), it is determined for all of the triangles associated with a stationary receiver 12 whether any of its OP3 values are equal to zero. If so, then at step (406), the OP4 values of all stationary receiver 12 associated with the triangle are set to zero, thus effectively removing that particular effects device 17 from the calculations. Otherwise, at step (404), the OP4 values for triangle are set to the OP3 values. Calculations proceed to OP5*a* 218.

Figure 6D:
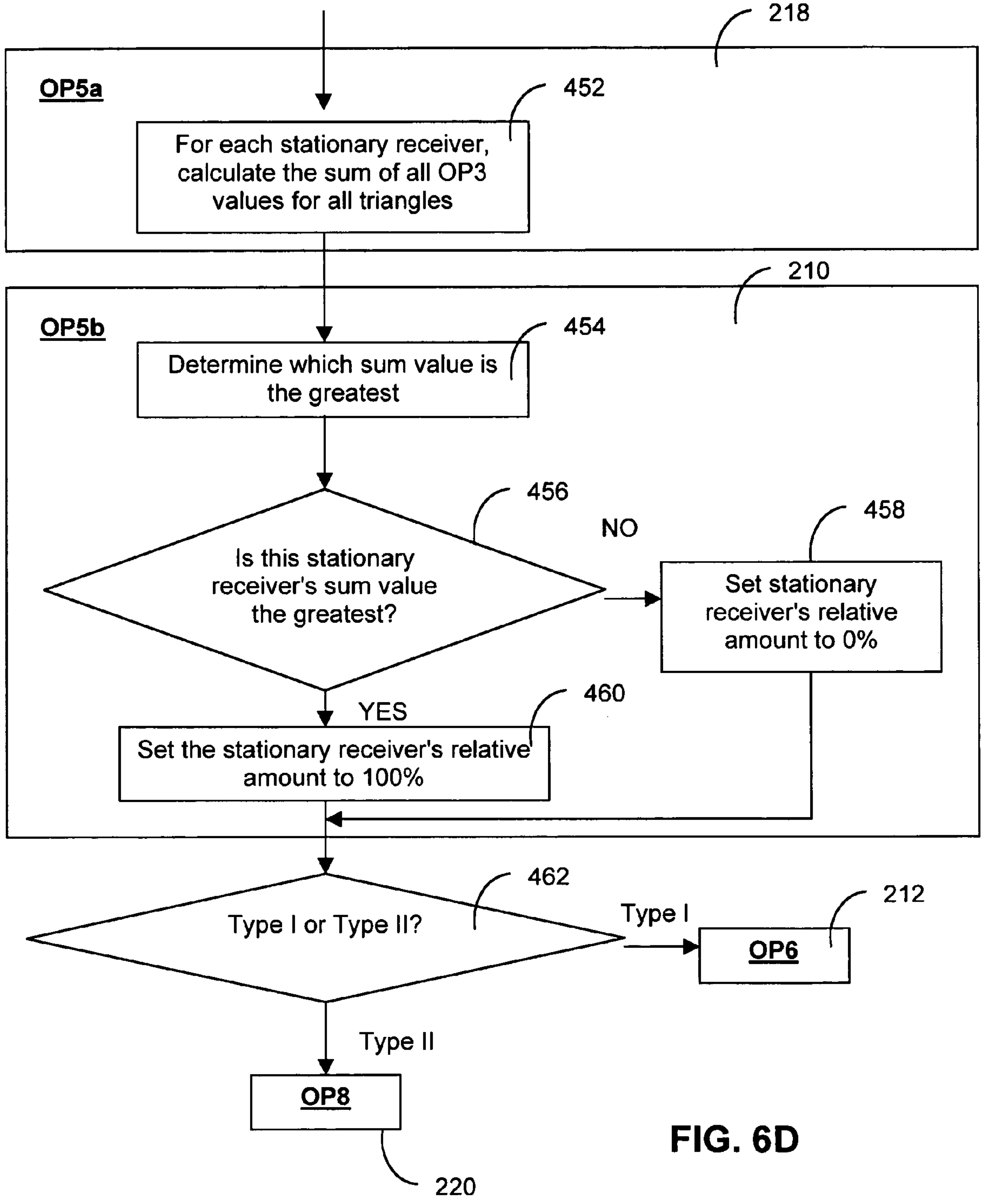

Referring to FIG. 6D, OP5*a* 218 and OP5*b* 210 are used for both Type I and Type II determinations. The purpose of OP5*a* 218, is to determine the sum of OP3 values for each stationary receivers 12. The purpose of OP5*b* 210 is to determine a default value in the case where the mobile target (M) is beyond the array of stationary receivers 12, that is where all triangles will return at least one zero OP3 value. At step (452), for each stationary receiver 12, the sum of all OP3 values across all triangles is calculated.

At step (454), the stationary receiver 12 with the greatest sum is determined. If at step (456), the stationary receiver's 12 sum value is determined to be the greatest of the sum values for all stationary receiver's 12, then its total relative amount is set to 100% at step (460). Otherwise, at step (458), its relative amount is set to 0%. At this point, branching occurs at step (462) depending on whether the user has chosen to proceed with the Type I or Type II determinations. For the Type I determination, the calculations proceed to OP6 212, whereas for Type II determination, the calculations proceed to OP8 220.

Figure 6E:
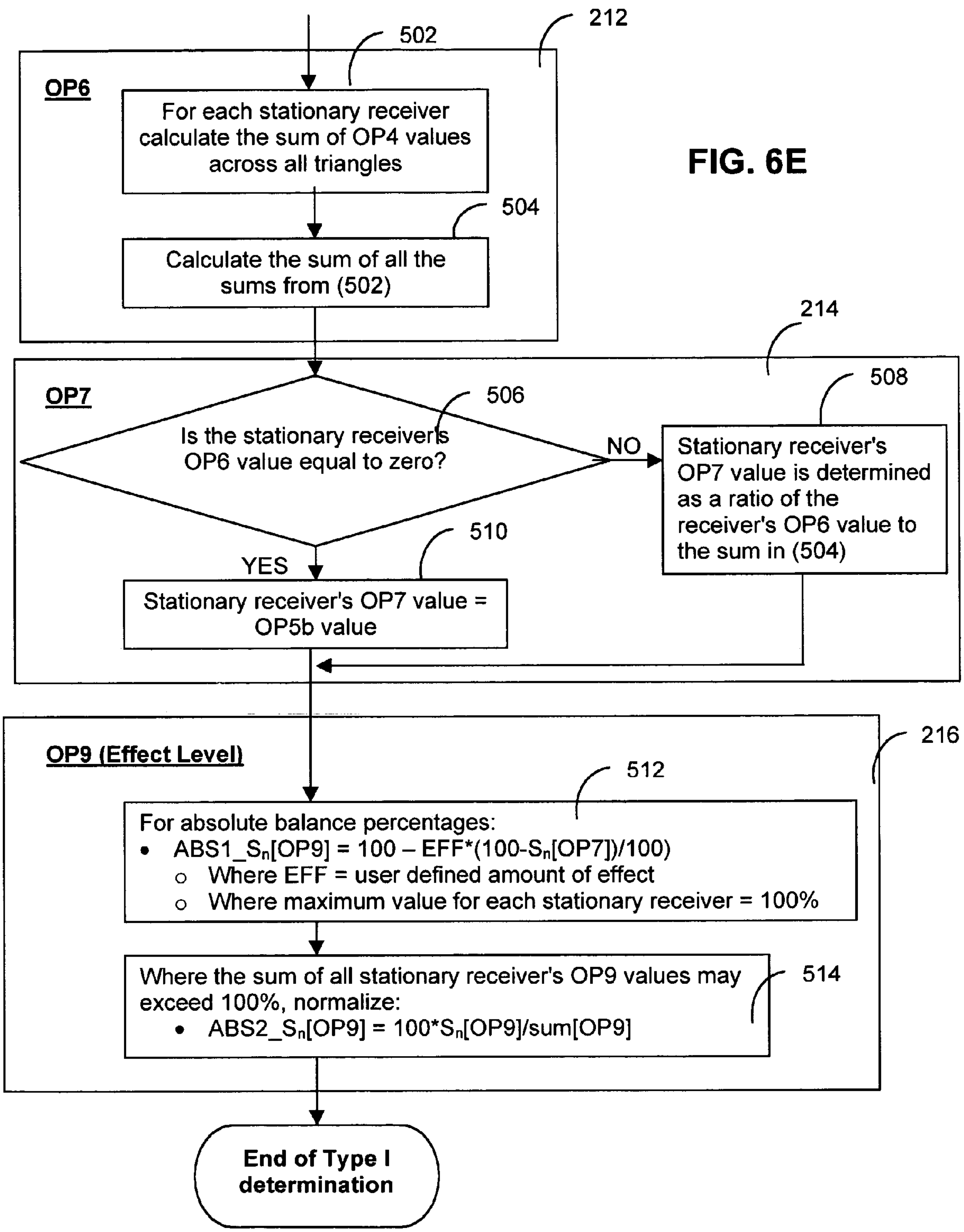

Referring to FIG. 6E, the final calculation steps for the Type I determination are illustrated. The purpose of OP6 212, is to determine for each stationary receiver 12 the sum of its OP4 values across all triangles as well as the overall sum of all of these sums. At step (502), for each stationary receiver 12, the sum of all of the OP4 values across all triangles is calculated. At step (504), the overall sum of all these sums is determined. The purpose of OP7 214 is to assign an OP7 value based on two scenarios: 1) where the mobile target 15 (M) is beyond the boundaries of the stationary receivers 12 and the closest effects device 17 needs to be turned on, and 2) where the mobile target 15 is within the boundaries of the stationary receivers 12 and the output of the effects device 17 is relative to the other effects devices 17. The absolute balance percentages are determined relative to a 100% factor.

At step (506), it is determined whether the sum of the stationary receiver's 12 OP6 values equals zero. If so, at step (510), the stationary receiver's 12 OP7 value equals the results of OP5*b*. Otherwise, at step (508), the stationary receiver's 12 OP7 value is determined to be a ratio of the stationary receiver's 12 OP6 value to the sum of all OP6 results. In the event that only a partial amount of effect is desired, subsequent operations may be executed in order to establish the amount of effect applied.

At OP9 216, a user defined amount of effect is applied, based on the effective level selected by the user through the user interface of the processing hub 14 for the entire effects automation system 10, as well as an effective level for each individual channel. At step (512), calculations are performed to yield the absolute balance percentage values. In situations where the sum of all stationary reference point's OP9 value may exceed 100 percent, normalization occurs at step (514). This ends the Type I determination for the point-to-point calculations.

Figure 6F:
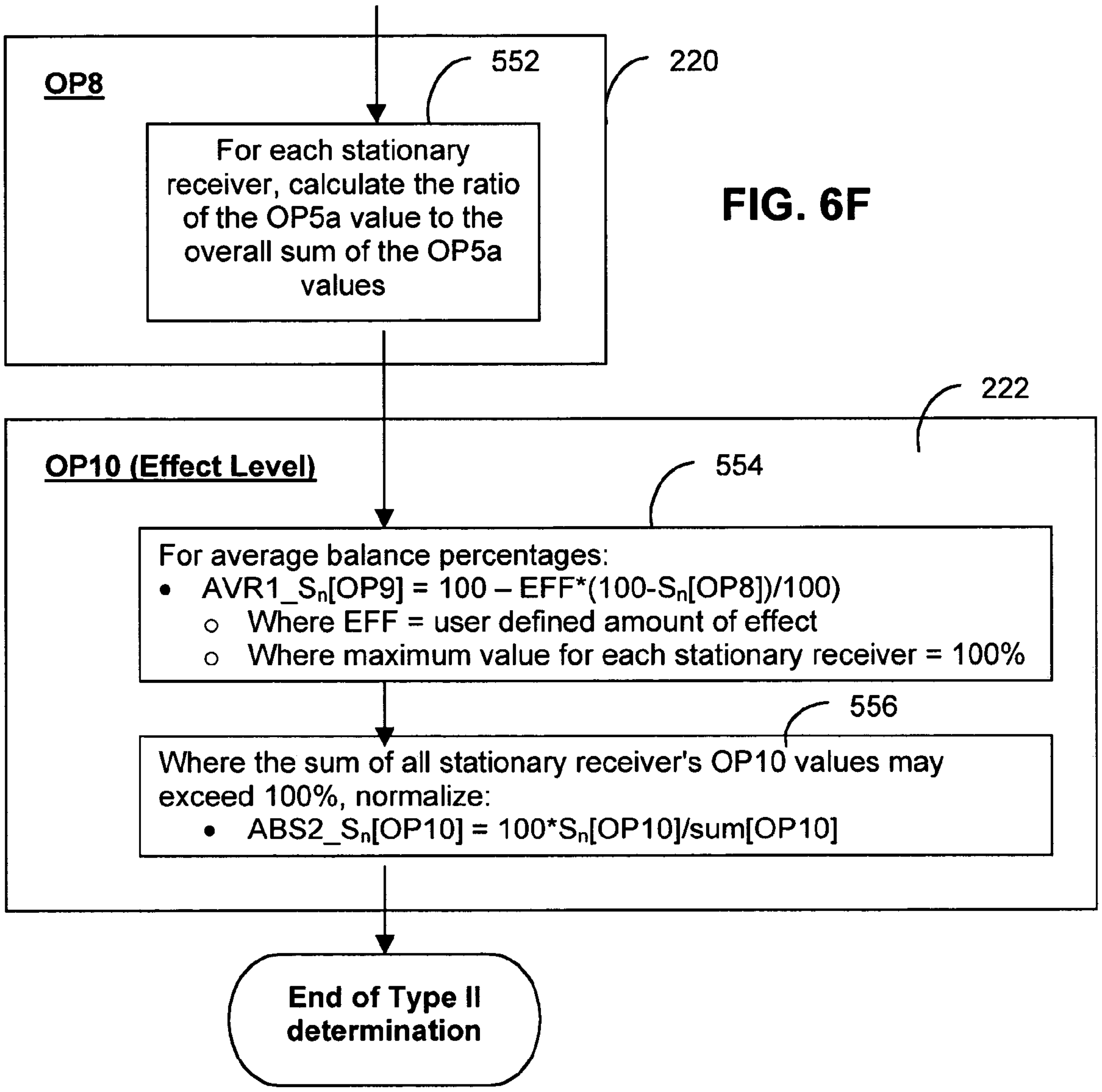

Referring to FIG. 6F, the final calculation steps for the Type II determination are illustrated. The purpose of OP8 220, is similar to that of OP7 214 in the Type I determination, except that since the output is relative to all the effects devices 17, there is no need to consider the location of the boundaries as in the Type I determination. The average balance percentages are determined relative to a 100% factor. Thus, at step (552), for each stationary receiver 12, the ratio of the OP5*a* value to the overall sum of the OP5*a* values is determined. In the effect that only a partial amount of effect is desired, subsequent operations may be executed in order to establish the amount of effect applied.

At OP10 222, a user defined amount of effect is applied to the OP8 values. The user selects the amount of effect using the user interface of the processing hub 14. At step (554), calculations are performed to yield the average balance percentage values. In situations where the sum of all stationary reference point's OP10 value exceeds 100 percent, normalization calculations are performed at step (556). This ends the Type II determination for the point-to-point calculations.

Referring now to FIGS. 8A, 8B, 8C, 9A, 9B, and 9C, a percentage value is obtained based on point-to-line calculations through a determination of relative distances, using in part, trilateration methods, which uses known locations of two or more reference points, and the measured distance between an object and each reference point. The point-to-line calculations are conducted to enhance the results obtained from the point-to-point calculations. It should be noted that while the demonstration is shown by measurement of lines obtained from TDOA data, the same calculation results could be obtained using measurement of angles, by triangulation methods.

Figure 9A:
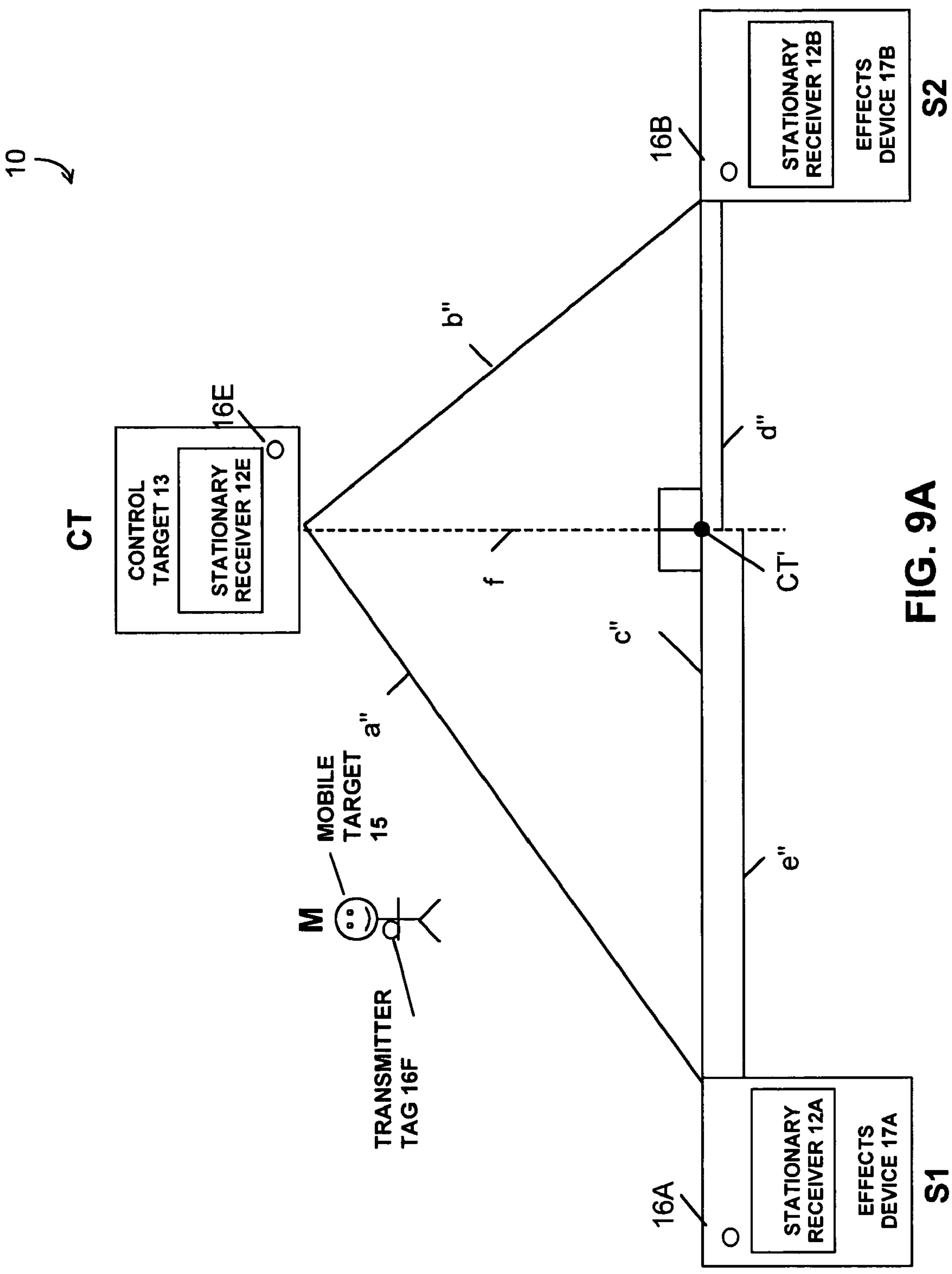
FIGS. 9A, 9B, and 9C are schematic diagrams of the point-to-line calculations for the effects automation system of FIG. 1.
Figure 9B:
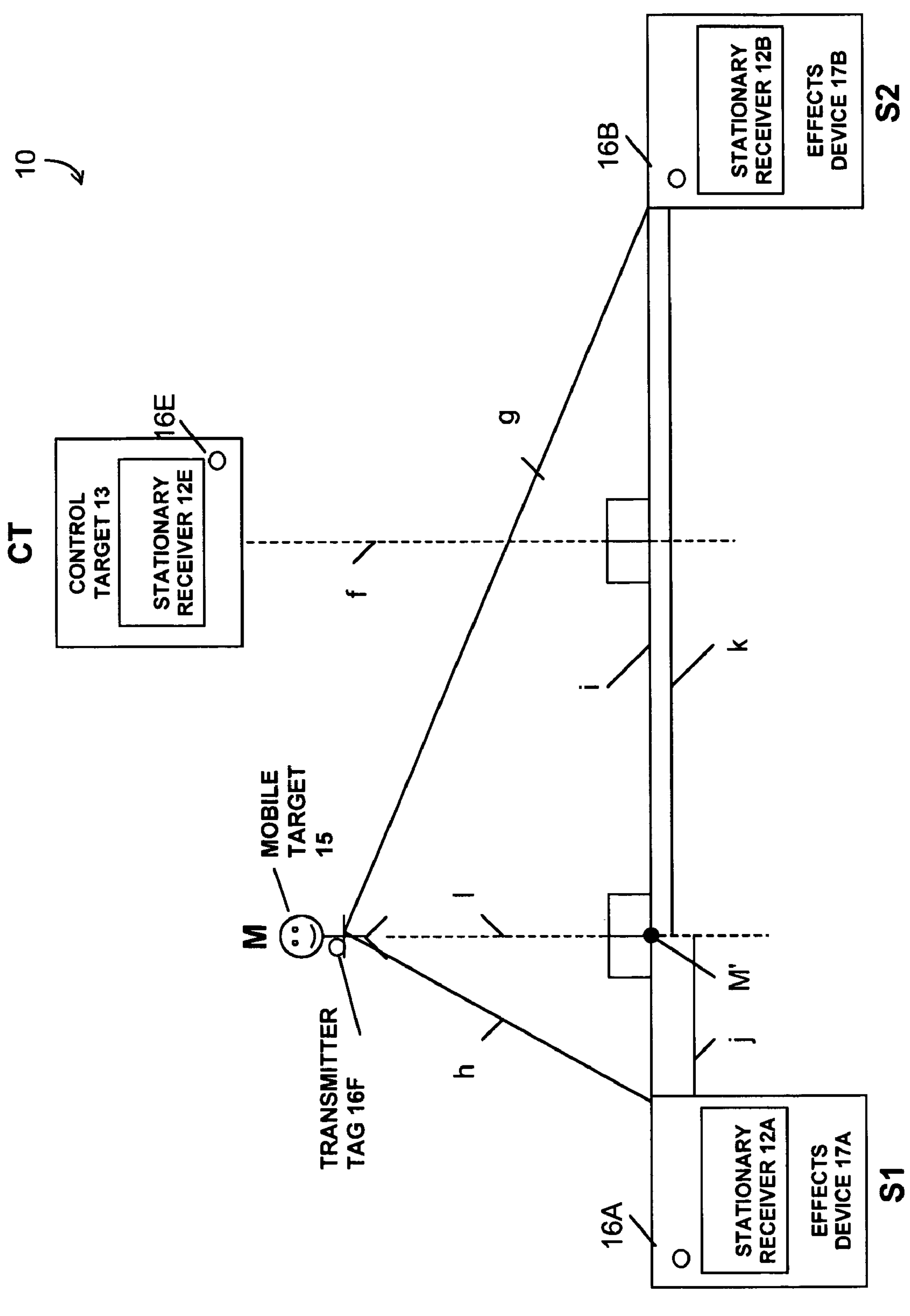
Figure 9C:
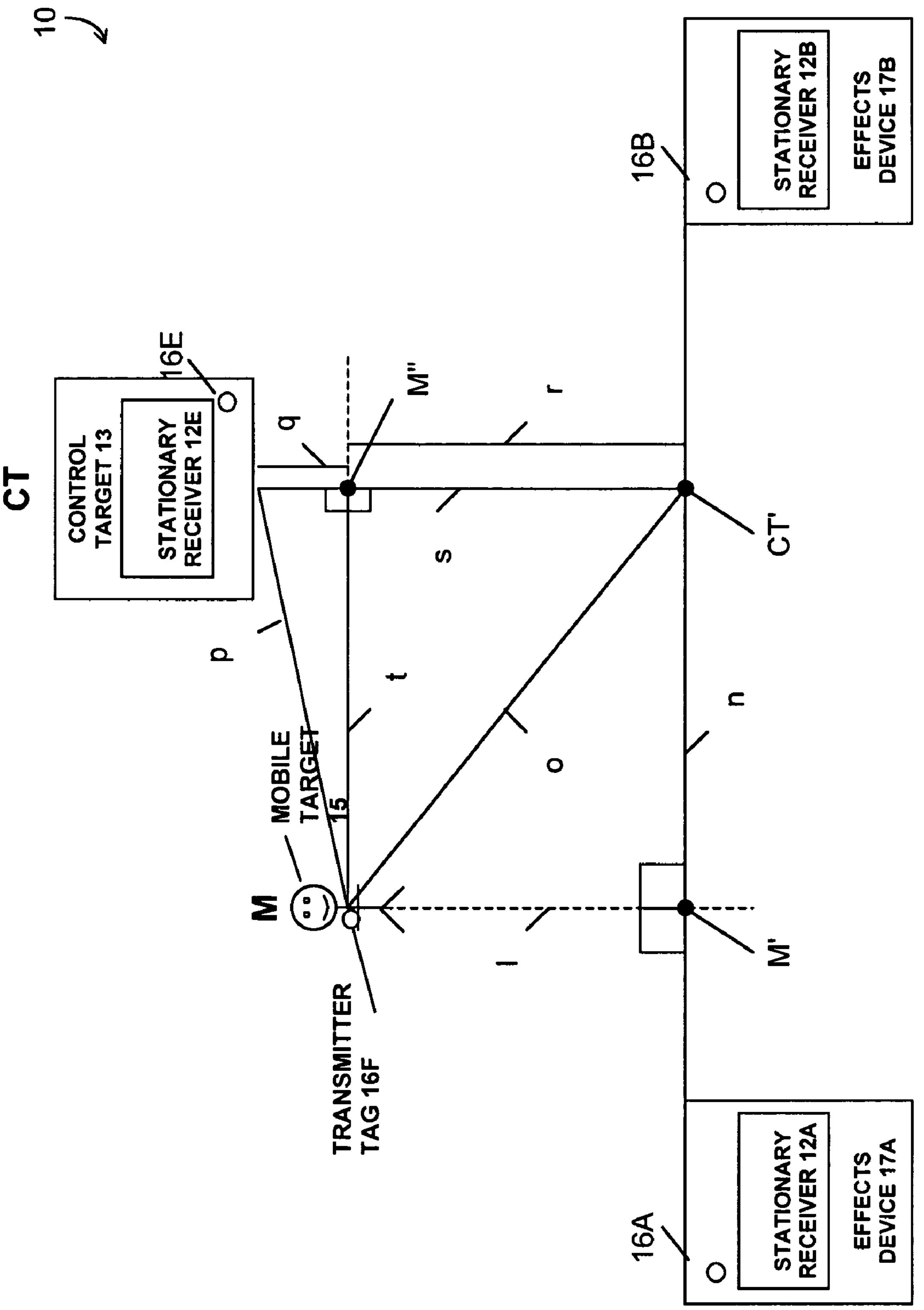

As shown in FIGS. 9A, 9B, and 9C, the mobile target 15 (M), is shown positioned in relation to two stationary receivers 12A and 12B (S1 and S2) associated with effects devices 17A and 17B, and a control target 13 (CT). Relative position values for more than two stationary receivers 12 (e.g. S1, S2, etc.) can be obtained for a mobile target 15 (M) and control target 13 (CT) as will be discussed.

Figure 8A:
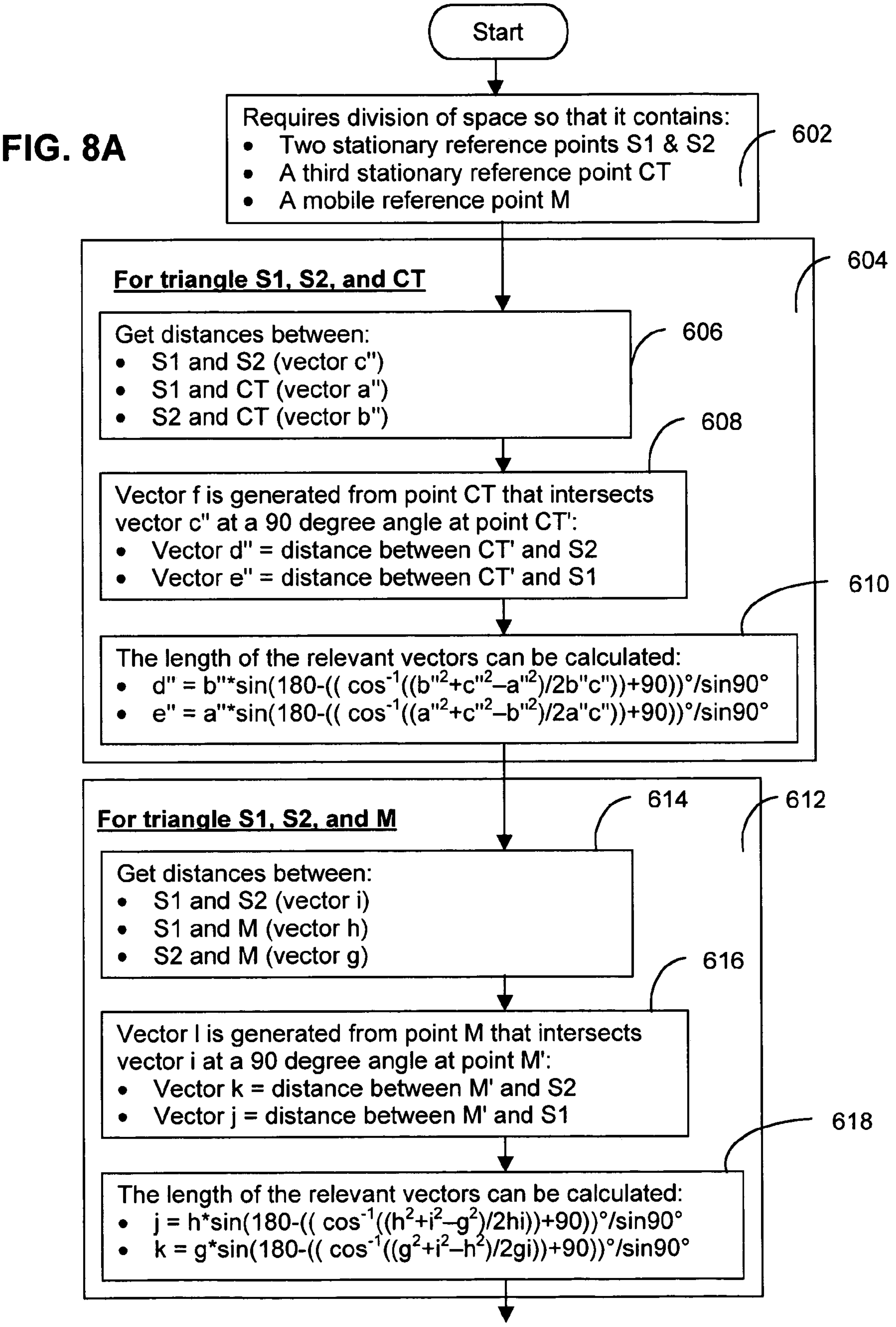
FIGS. 8A, 8B, and 8C are flowcharts illustrating the detailed process steps conducted by the calculate module for point-to-line calculations within the conversion module of the effects automation system of FIG. 1.

Referring to FIGS. 8A, 9A and 9B, the initial steps in the point-to-line calculation is illustrated. First, at step (602), the three-dimensional effect space is divided into configurations consisting of one mobile target 15 (M), two stationary receivers 12 (S1 and S2) and a control target 13 (CT). At step (604), the triangle formed by the first stationary receiver 12A (S1), the second stationary receiver 12B (S2), and the control target 13 (CT) as illustrated in FIG. 9A is considered.

Specifically, the following vectors are obtained at step (606): vector c" representing the distance between the first stationary receiver 12A (S1) and the second stationary receiver 12B (S2), vector a" representing the distance between the first stationary receiver 12A (S1) and the control target 13 (CT), and vector b" representing the distance between the second stationary receiver 12B (S2) and the control target 13 (CT). At step (608), vector f is generated from the control target (CT) that intersects vector c" at a 90 degree angle at a point CT'. The following additional vectors are obtained: vector d" representing the distance between CT' and the second stationary receiver 12B (S2) and vector e" representing the distance between CT' and the first stationary receiver 12A (S1). As conventionally known, where the lengths of vectors a", b", and c" are known, the length of vectors d" and e" can be calculated by application of the sine and cosine laws at step (610).

At step (612), the triangle formed by the first stationary receiver 12A (S1), the second stationary receiver 12B (S2), and the mobile target 15 (M) as illustrated in FIG. 9B is considered. The following vectors are obtained at step (614): vector i representing the distance between the first stationary receiver 12A (S1) and the second stationary receiver 12B (S2), vector h representing the distance between the first stationary receiver 12A (S1) and the mobile target 15 (M), and vector g representing the distance between the second stationary receiver 12B (S2) and the mobile target 15 (M). At step (616), vector I is generated from the mobile target 15 (M) that intersects vector i at a 90 degree angle at a point M'. The following additional vectors are obtained: vector k representing the distance between M' and the second stationary receiver 12B (S2) and vector j representing the distance between M' and the first stationary receiver 12A (S1). As conventionally known, where the lengths of vectors i, h, and g are known, the length of vectors j and k can be calculated by application of the sine and cosine laws at step (618).

Figure 8B:
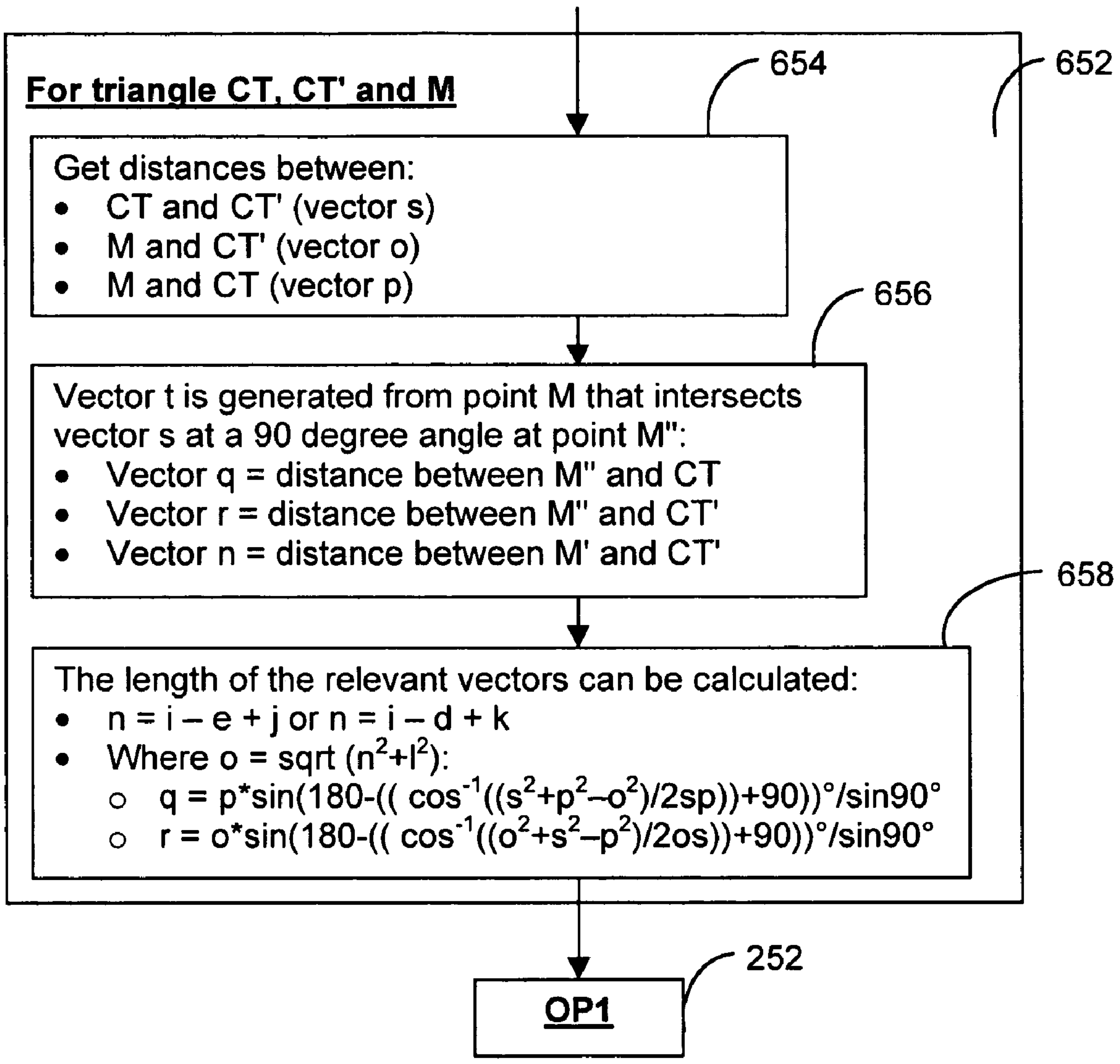
Figure 8C:
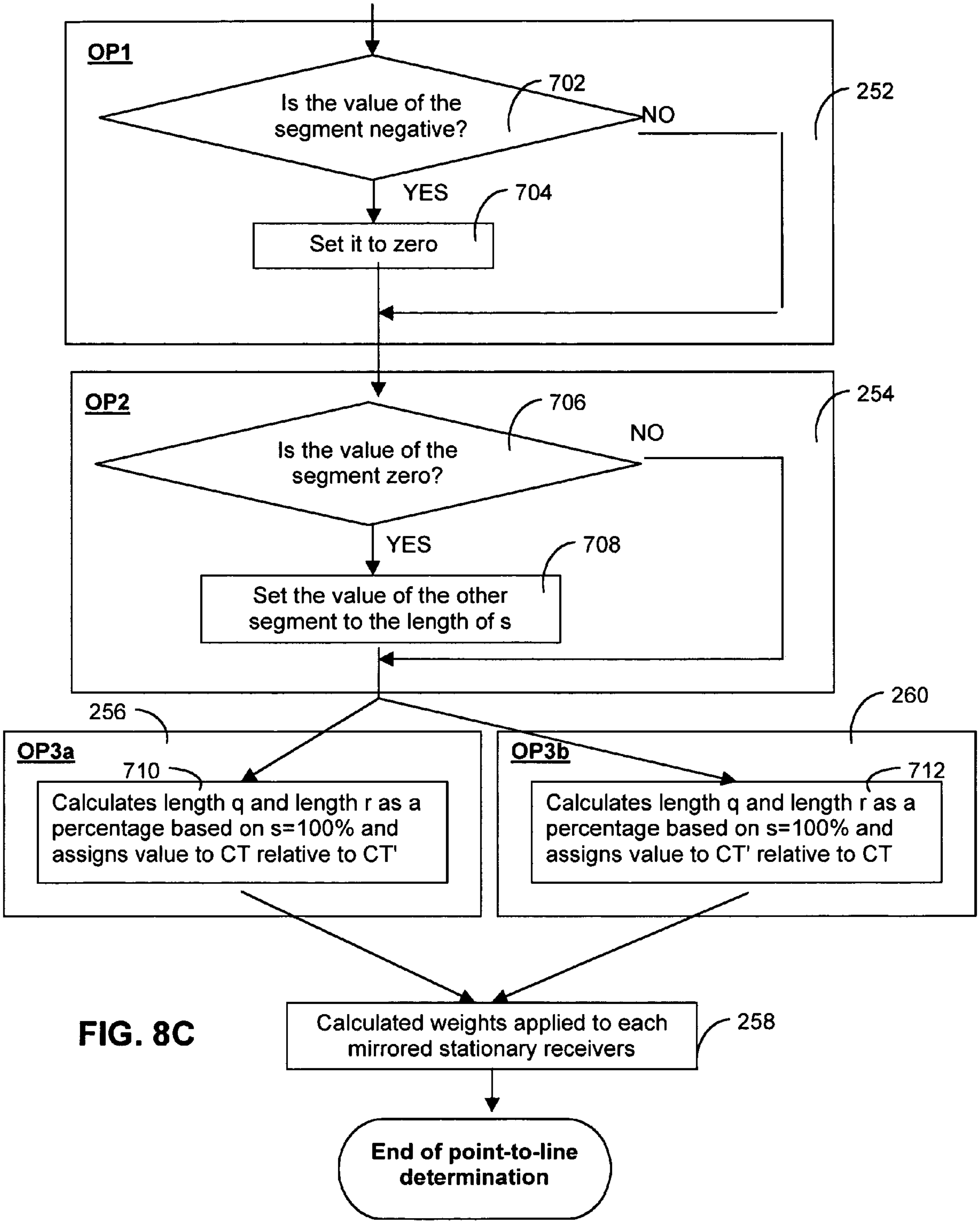

Referring to FIGS. 8B and 9C, further initial steps in the point-to-line calculation are illustrated. At step (652), the triangle formed by the control target 13 (CT), point CT', and the mobile target 15 (M) as illustrated in FIG. 9C is considered. The following vectors are obtained at step (654): vector s representing the distance between the control target 13 (CT) and CT', vector o representing the distance between the mobile target 15 (M) and CT', and vector p representing the distance between the mobile target 15 (M) and the control target 13 (CT). At step (656), vector t is generated from the mobile target 15 (M) that intersects vector s at a 90 degree angle at a point M". The following additional vectors are obtained: vector q representing the distance between M" and the control target 13 (CT) and vector r representing the distance between M" and CT'. Additionally utilizing basic mathematical principles in combination with the vectors obtained in previous steps, vector n representing the distance between M' and CT' is also obtained. As conventionally known, where the lengths of vectors s, p, and o are known, the length of vectors q and r can be calculated by application of the sine and cosine laws at step (658).

Referring to FIGS. 8C, 9A, 9B and 9C, OP1 252, OP2 254, OP3*a* 256, and OP3*b* 260 are operations that occur for the point-to-line calculations. In particular, OP1 252 and OP2 254 are executed in the situation where the triangle formed by the mobile target 15 (M), control target 13 (CT), and point CT' (FIG. 9C) is obtuse. The purpose of OP1 252 is to set any negative segment values with any of the triangles defined in FIGS. 9A, 9B and 9C to zero. At step (702), the value of the segment is checked to see whether it is negative or not. If so, at step (704), the value of the segment is set to zero. Otherwise, the value of the vector segment remains the same.

Proceeding to OP2 254, its purpose is to set the value of the current segment to the length of vector s if the corresponding segment's value is zero. At step (706), the value of the segment is checked to see if it is zero. If so, at step (708), the value of the other segment is set to the length of vector s. Otherwise, the value of the vector segment remains the same.

The calculations then proceed to OP3*a* 256 or OP3*b* 260. At step (710) of OP3*a* 256, a value for the control target 13 (CT) relative to CT' is calculated based on the length of q and r. At step (712) of OP3*b* 260, a value for CT' relative to the control target 13 (CT) is calculated based on the length of q and r. Finally, once these relative weights are calculated, at step (258), the values can be applied to each mirrored controllable device. This is the end of the point-to-line determination.

Figure 10A:
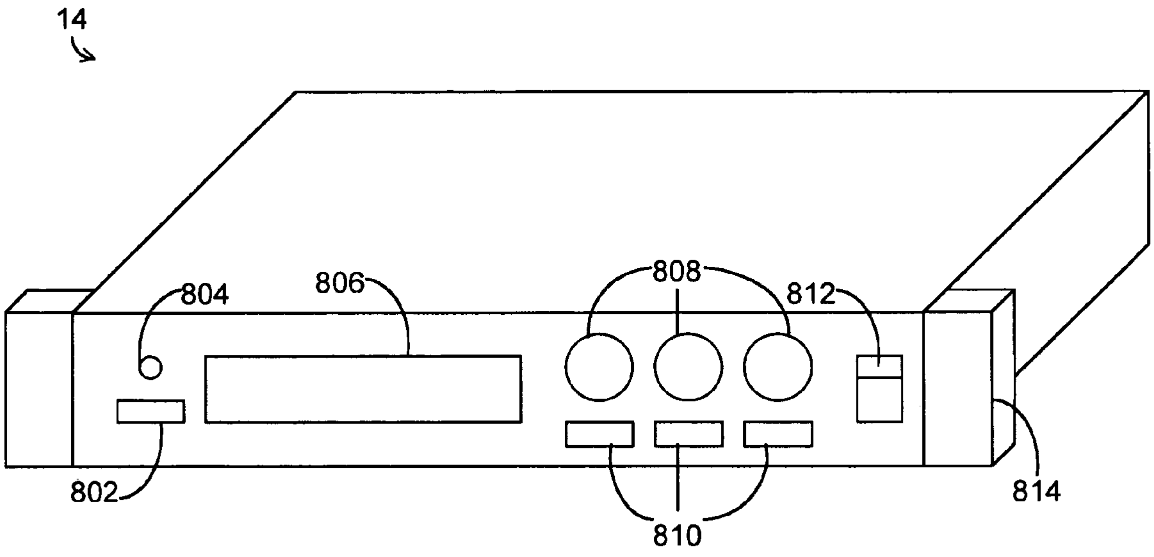
FIGS. 10A and 10B are schematic diagrams illustrating the user interface of the processing hub within the effects automation system of FIG. 1.
Figure 10B:
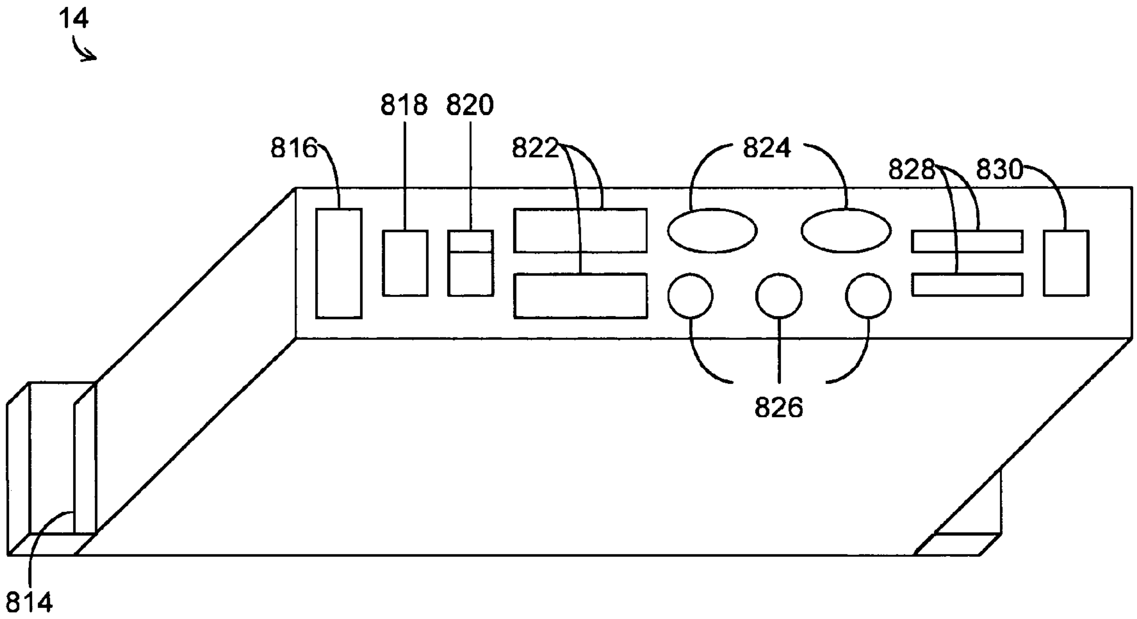

Reference is now made to FIGS. 10A and 10B. The processing hub 14 is the housing for the location tracking module 18 and conversion module 20. The physical system consists of a 2U rack-mountable chassis 814. While processing hub 14 is shown in FIGS. 10A and 10B to be a separate and self-contained device, it should be understood that processing hub 14 could be implemented and physically located within one or a plurality of stationary receivers 12, or within any other element of effects automation system 10.

In a preferred embodiment, a frontal view of the processing hub 14 includes the following user interface features: a calibrate button 802, a light emitting diode (LED) calibration status indicator 804, a liquid crystal display (LCD) display 806, user input knobs 808, user input keypads 810, and a universal serial bus (USB) port 812. The user-interface allows the user to adjust parameters including the determination type to be used, the effect level, and the output data format. Additionally, the user-interface could facilitate the entry of other settings, such as: MIDI channels, system exclusive information, program change number, and controller references. It should be noted that any data input could be facilitated by way of external software running on a personal computer hooked up to the processing hub unit 14.

A panel of the processing hub 14 includes various device ports and a power switch 816 for the system. An Ethernet port 818 and an additional USB port 820 are provided for communicating with more sophisticated external software or to facilitate downloadable software upgrades and drivers from a host computer. Expansion/option slots 822 are provided for implementing additional features. Digital Multiplexed (DMX) 824, musical instrument digital interface (MIDI) 826, and serial (RS-232) 828 are examples of output ports for the control of various effects devices 17, however additional multimedia ports may be added. A category 5 (CAT5) input port 830 is provided for connection and gathering of information from the stationary receivers 12.

Figure 11:
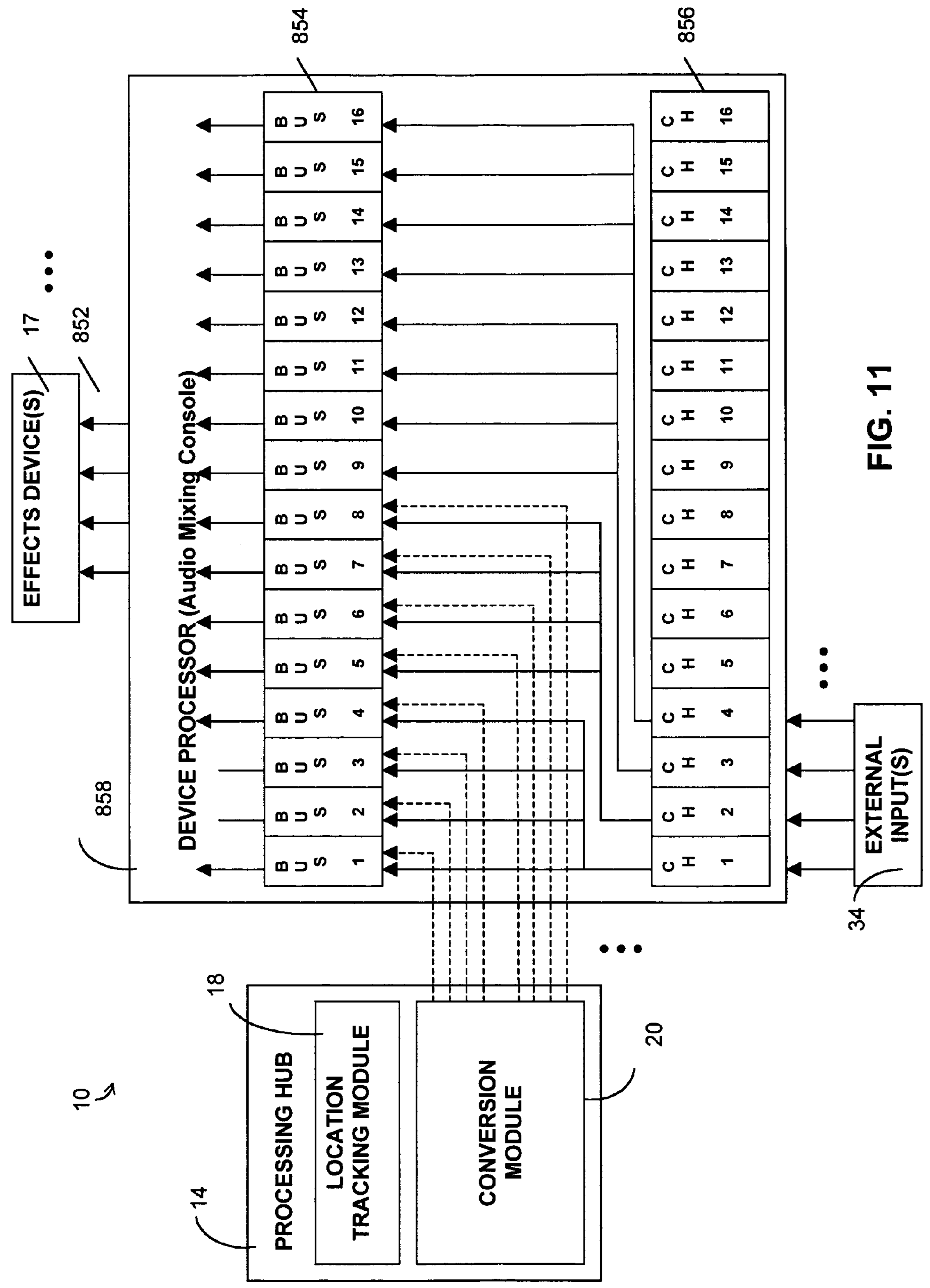
FIG. 11 is a schematic diagram illustrating the output of signals from the processing hub and into the device processor within the effects automation system of FIG. 1.

FIG. 11 illustrates how a particular instance of device processor 32, namely an audio mixing console 858 couples external inputs 34 with the control data generated by the conversion module 20 of the processing hub 14. The effects automation system 10 can be integrated with any existing custom configured audio mixing console or an audio matrix system that facilitates external control automation. An inline digital mixer with sixteen channels, sixteen busses, and four outputs is illustrated in this example. In this example, the signal output of each channel 856 is distributed equally to four mixer busses 854 that correspond with the relative outputs 852.

The control data generated by the conversion module 20 is mapped onto the busses in order to provide automation instructions for the output signal 852. Automation instructions can be applied to various audio mixing console parameters including: volume, pitch, equalization, time delay, echo, reverberation, special effects, and others. In the representation shown, each group of four busses 854 will represent automation for one transmitter tag 16, and hence, a device processor 32 shown as an audio mixing console with four busses 852 will have the capacity for four stationary receivers 12.

It should be understood that the preceding describes only one example implementation of the effects automation system 10 and that many other implementations are possible. For example, the calculations performed by convert module 30 and calculate module 26 could be based on relative angle measurements associated with the various vector segments of FIGS. 7A, 7B, 9A, 9B and 9C. Basic mathematical principles can be applied to these relative angle measurements to yield relative distance values, from which the operations outlined in FIGS. 6A, 6B, 6C, 6D, 6E, 6F, 8A, 8B, and 8C can be applied.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An effects automation system for generating control data for the control of first and second effects devices, based on the relative position of a mobile target, the system comprising:

(a) a first stationary receiver and a second stationary receiver for receiving signals and transmitting data;

(b) a first stationary transmitter tag and a second stationary transmitter tag, said first and second stationary transmitter tags for transmitting signals to the first and second stationary receivers;

(c) a mobile transmitter tag coupled to the mobile target, said mobile transmitter tag for transmitting signals to the first and second stationary receivers;

(d) a processing hub in data communication with the first and second stationary receivers for determining a first relative position value for the first stationary receiver and a second relative position value for the second stationary receiver, said processing hub including:

(I) a memory for storing said first and second relative position values;

(II) a processor coupled to the memory for:

(A) receiving data from the first and second stationary receivers that corresponds to the signals transmitted by the stationary transmitter tags and the mobile transmitter tag;

(B) utilizing the data that corresponds to signals transmitted by the first and second stationary transmitter tags to determine the relative distance between the first and second stationary receivers;

(C) utilizing the data that corresponds to signals transmitted by the mobile transmitter tag and the data that corresponds to signals transmitted by the first and second stationary transmitter tags to determine the relative distances between the mobile target and each of the first and second stationary receivers;

(D) determining the first and second relative position values based on the relative distances determined in (B) and (C), where the first relative position value corresponds to the proportion of the relative distance between the first and second stationary receivers associated with the mobile target and the second stationary receiver and where the second relative position value corresponds to the proportion of the relative distance between the first and second stationary receivers associated with the mobile target and the first stationary receiver; and (E) utilizing the first and second relative position values to generate the control data for control of the first and second effects devices.

2. The system of claim 1, wherein the processor determines the first and second relative position values by:

(i) establishing a line that runs between the first and second stationary receivers;

(ii) establishing a vector that runs from the mobile target to the line in (i) and which intersects the line in (i) at an angle of 90 degrees at a mobile intersection point;

(iii) establishing a first segment defined by the portion of the line in (i) which runs from the mobile intersection point to the first stationary receiver;

(iv) establishing a second segment defined by the portion of the line in (i) which runs from the mobile intersection point to the second stationary receiver; and (v) utilizing the relative lengths of the first and second segments to determine the first and second relative position values.

3. The system of claim 1, further including a third stationary receiver and a third stationary transmitter tag coupled to the third stationary receiver, wherein the processing hub also determines a third relative position value for the third stationary receiver based on the relative position of the mobile target, wherein the memory also stores the third relative position value, wherein the first and second transmitter tags and the mobile transmitter tag also transmit signals to the third stationary receiver, wherein the processor also:

(F) receives data from the third stationary receiver that corresponds to the signals transmitted from the third stationary receiver;

(G) determines the first, second and third relative position values by defining three triangles by the mobile target and two of the first, second and third stationary receivers, and for each triangle:

(i) establishing a line that runs between the two of the first, second and third stationary receivers;

(ii) establishing a vector that runs from the mobile target to the line in (i) and which intersects the line in (i) at an angle of 90 degrees at a mobile intersection point;

(iii) establishing a first segment defined by the portion of the line in (i) which runs from the mobile intersection point to one of the two stationary receivers in (i);

(iv) establishing a second segment defined by the portion of the line in (i) which runs from the mobile intersection point to the other of the two stationary receivers in (i); and (v) utilizing the relative lengths of the first and second segments to determine relative position values for that triangle.

4. The system of claim 3, wherein the processor also determines for each triangle if the value of one of the first and second segments is negative, and if so, sets the value of said one of said first and second segments to zero.

5. The system of claim 4, wherein the processor also determines for each triangle if the value of one of said first and second segments is zero, and if so, sets the value of the other of said first and second segments to the length of the line in (i) for that triangle.

6. The system of claim 5, wherein the processor also converts the first and second segments into first and second percentage values such that the first and second percentage values when added equal 100%.

7. The system of claim 6, wherein the processor also determines whether for each triangle, whether the percentage value of one the first and second segments for that triangle is equal to zero and if so, sets both of the first and second segments for that triangle to zero.

8. The system of claim 6, wherein the processor determines for each stationary receiver, the sum of the first and second percentage values across all triangles.

9. The system of claim 8, wherein the processor determines which one of the first, second, and third stationary receivers has the largest sum in claim 8 and sets the value of that one to 100% and the value of other two to 0%.

10. The system of claim 9, wherein the processor determines for each triangle a first sum of the first and second segment values from claim 7 and determines a second sum which is the sum of all of the first sums.

11. The system of claim 10, wherein the processor also determines for each stationary receiver, whether the first sum from claim 10 is equal to zero, and if so the stationary receiver's percentage value is set to the value determined in claim 9, and if not the stationary receiver's percentage value is determined as a ratio of the first sum of claim 10 to the second sum of claim 10.

12. The system of claim 11, wherein the processor calculates a set of absolute balance percentages based on a predetermined effect value according to the stationary receiver percentage value in claim 11 and the predetermined effect value such that the maximum value for each stationary receiver is 100%.

13. The system of claim 8, wherein the processor also determines an overall sum equaling the sum of all the sums determined in claim 8 and then determines for each stationary receiver, the ratio of the sum determined in claim 8 to the overall sum.

14. The system of claim 13, wherein the processor calculates a set of average balance percentages based on a predetermined effect value according to the stationary receiver percentage values in claim 13 and the predetermined effect value such that the maximum value for each stationary receiver is 100%.

15. The system of claim 2, further including a control target and a control transmitter tag coupled to the control target, wherein the processor determines first mirrored and second mirrored relative position values for the first and second stationary receivers by:

(vi) establishing a line that runs from the control target to the line in (i) and which intersects the line in (i) at an angle of 90 degrees at a control intersection point;

(vii) establishing a third segment defined by the portion of the line in (vi) which runs from the control intersection point to the first stationary receiver; and (viii) establishing a fourth segment defined by the portion of the line in (vi) which runs from the control intersection point to the second stationary receiver.

16. The system of claim 15, wherein the processor determines first mirrored and second mirrored relative position values for the first and second stationary receivers by:

(ix) establishing a line that runs from the control target to the control intersection point;

(x) establishes a line that runs from the mobile target to the line in (ix) and which intersects the line in (ix) at an angle of 90 degrees at a mobile control intersection point;

(xi) establishing a fifth segment defined by the portion of the line in (ix) which runs from the mobile control intersection point to the control intersection point;

(xii) establishing a sixth segment defined by the portion of the line in (ix) which runs from the mobile control intersection point to the control target; and (xiii) using the relative lengths of the first, second, fifth and sixth segment lengths to determine the first mirrored and second mirrored relative position values.

17. The system of claim 16, wherein the processor also determines if the value of one of the fifth and sixth segments is negative, and if so, sets the value of said one of said fifth and sixth segments to zero.

18. The system of claim 17, wherein the processor also determines if the value of one of said fifth and sixth segments is zero, and if so, sets the value of the other of said fifth and sixth segment to the length of the line in (ix).

19. The system of claim 18, wherein the processor also converts said fifth and sixth segments into first mirrored and second mirrored percentage values such that the first mirrored and second mirrored percentage values when added equal 100%.

20. A method for generating control data for the control of first and second effects devices based on the relative position of a mobile target, wherein first and second transmitter tags and a mobile transmitter tag are used to transmit signals to first and second stationary receivers, the method comprising:

(a) receiving data from the first and second stationary receivers that corresponds to the signals transmitted by the stationary transmitter tags and the mobile transmitter tag;

(b) utilizing the data that corresponds to signals transmitted by the first and second stationary transmitter tags to determine the relative distance between the first and second stationary receivers;

(c) utilizing the data that corresponds to signals transmitted by the mobile transmitter tag and the data that corresponds to signals transmitted by the first and second stationary transmitter tags to determine the relative distances between the mobile target and each of the first and second stationary receivers;

(d) determining the first and second relative position values based on the relative distances determined in (b) and (c), where the first relative position value corresponds to the proportion of the relative distance between the first and second stationary receivers associated with the mobile target and the second stationary receiver and where the second relative position value corresponds to the proportion of the relative distance between the first and second stationary receivers associated with the mobile target and the first stationary receiver; and (e) utilizing the first and second relative position values to generate the control data for control of the first and second effects devices.

21. The method of claim 20, wherein the first and second relative position values are determined by:

(i) establishing a line that runs between the first and second stationary receivers;

(ii) establishing a vector that runs from the mobile target to the line in (i) and which intersects the line in (i) at an angle of 90 degrees at a mobile intersection point;

(iii) establishing a first segment defined by the portion of the line in (i) which runs from the mobile intersection point to the first stationary receiver;

(iv) establishing a second segment defined by the portion of the line in (i) which runs from the mobile intersection point to the second stationary receiver; and (v) utilizing the relative lengths of the first and second segments to determine the first and second relative position values.

22. The method of claim 20, further including a third stationary receiver and a third stationary transmitter tag coupled to the third stationary receiver, wherein a third relative position value is also determined for the third stationary receiver based on the relative position of the mobile target, wherein the first and second transmitter tags and the mobile transmitter tag also transmit signals to the third stationary receiver, and further comprising:

(f) receiving data from the third stationary receiver that corresponds to the signals transmitted from the third stationary receiver;

(g) determining the first, second and third relative position values by defining three triangles by the mobile target and two of the first, second and third stationary receivers, and for each triangle:

(i) establishing a line that runs between the two of the first, second and third stationary receivers;

(ii) establishing a vector that runs from the mobile target to the line in (i) and which intersects the line in (i) at an angle of 90 degrees at a mobile intersection point;

(iii) establishing a first segment defined by the portion of the line in (i) which runs from the mobile intersection point to one of the two stationary receivers in (i);

(iv) establishing a second segment defined by the portion of the line in (i) which runs from the mobile intersection point to the other of the two stationary receivers in (i); and (v) utilizing the relative lengths of the first and second segments to determine relative position values for that triangle.

23. The system of claim 22, wherein for each triangle, it is determined if the value of one of the first and second segments is negative, and if so, the value of said one of said first and second segments is set to zero.

24. The method of claim 23, wherein for each triangle, it is determined if the value of one of said first and second segments is zero, and if so, the value of the other of said first and second segments is set to the length of the line in (i) for that triangle.

25. The method of claim 24, wherein the first and second segments are converted into first and second percentage values such that the first and second percentage values when added equal 100%.

26. The method of claim 25, wherein for each triangle, it is determined whether the percentage value of one the first and second segments for that triangle is equal to zero and if so, both of the first and second segments for that triangle are set to zero.

27. The method of claim 26, wherein for each stationary receiver, the sum of the first and second percentage values across all triangles is determined.

28. The method of claim 27, wherein it is determined which one of the first, second, and third stationary receivers has the largest sum in claim 28 and the value of that one is set to 100% and the value of other two is set to 0%.

29. The method of claim 28, wherein for each triangle a first sum of the first and second segment values from claim 27 is determined and a second sum which is the sum of all of the first sums is determined.

30. The method of claim 29, wherein for each stationary receiver, it is determined whether the first sum from claim 30 is equal to zero, and if so the stationary receiver's percentage value is set to the value determined in claim 29, and if not the stationary receiver's percentage value is determined as a ratio of the first sum of claim 30 to the second sum of claim 30.

31. The method of claim 30, wherein a set of absolute balance percentages are determined based on a predetermined effect value according to the stationary receiver percentage value in claim 31 and the predetermined effect value such that the maximum value for each stationary receiver is 100%.

32. The method of claim 27, wherein an overall sum equaling the sum of all the sums determined in claim 27 is determined and then for each stationary receiver, the ratio of the sum determined in claim 27 to the overall sum is determined.

33. The method of claim 32, wherein a set of average balance percentages is determined based on a predetermined effect value according to the stationary receiver percentage values in claim 32 and the predetermined effect value such that the maximum value for each stationary receiver is 100%.

34. The method of claim 21, further including a control target and a control transmitter tag coupled to the control target, wherein first mirrored and second mirrored relative position values for the first and second stationary receivers are determined by:

(vi) establishing a line that runs from the control target to the line in (i) and which intersects the line in (i) at an angle of 90 degrees at a control intersection point;

(vii) establishing a third segment defined by the portion of the line in (vi) which runs from the control intersection point to the first stationary receiver; and (viii) establishing a fourth segment defined by the portion of the line in (vi) which runs from the control intersection point to the second stationary receiver.

35. The method of claim 34, wherein the processor determines first mirrored and second mirrored relative position values for the first and second stationary receivers by:

(ix) establishing a line that runs from the control target to the control intersection point;

(x) establishing a line that runs from the mobile target to the line in (ix) and which intersects the line in (ix) at an angle of 90 degrees at a mobile control intersection point;

(xi) establishing a fifth segment defined by the portion of the line in (ix) which runs from the mobile control intersection point to the control intersection point;

(xii) establishing a sixth segment defined by the portion of the line in (ix) which runs from the mobile control intersection point to the control target; and (xiii) using the relative lengths of the first, second, fifth and sixth segment lengths to determine the first mirrored and second mirrored relative position values.

36. The method of claim 35, wherein if the value of one of the fifth and sixth segments is negative, the value of said one of said fifth and sixth segments is set to zero.

37. The method of claim 36, wherein if the value of one of said fifth and sixth segments is zero, the value of the other of said fifth and sixth segment is set to the length of the line in (ix).

38. The system of claim 37, wherein the fifth and sixth segments are converted into first mirrored and second mirrored percentage values such that the first mirrored and second mirrored percentage values when added equal 100%.

* * * * *

UNITED STATES PATENT AND TRADEMARK OFFICE

CERTIFICATE OF CORRECTION

PATENT NO. : 7,295,158 B2
APPLICATION NO. : 11/167308
DATED : November 13, 2007
INVENTOR(S) : Andrew Michael Morris It is certified that error appears in the above-identified patent and that said Letters Patent is hereby corrected as shown below:

Column 15, lines 24, 25, 35, 37, 63 and 67; column 16, lines 13, 16, 21, 24, 28 and 30; column 17, lines 7, 18, 26, 28, 32, 37, 40, 51 and 54; column 18, lines 45, 49, 64 and 67; column 19, lines 5, 8, 11, 12, 54 and 65; and column 20, lines 7, 9, 13, 18, 20, 32 and 35 for the phrase “stationary receiver”, each occurrence, should read -- stationary transceiver --.

Column 15, lines 30, 33, 35, 41, 49, 56, 61 and 66; column 16, lines 7, 35, 38, 46 and 50; column 17, lines 10, 45 and 58, column 18, lines 24, 25, 33, 39, 44, 48 and 57; column 19, lines 17, 20, 27, 31 and 58; and column 20, lines 25 and 39 for the phrase “stationary receivers”, each occurrence, should read -- stationary transceivers --.

Column 16, line 22, and column 19 line 6 the phrase “coupled to the third stationary receiver” has been removed.

Column 16, line 31, and column 19 line 13 the phrase “from the third stationary receiver;” has been changed to -- by the stationary transmitter tags and the mobile transmitter tag; --, so that the line reads -- corresponds to the signals transmitted by the stationary transmitter tags and the mobile transmitter tag; --.

Column 17, lines 19 and 21; column 19 line 67; and column 20 line 2 for the phrase “stationary receiver’s”, each occurrence, should read -- stationary transceiver’s --.

Signed and Sealed this

Twenty-fifth Day of August, 2009

David J. Kappos

*Director of the United States Patent and Trademark Office*